US012682317B2

(12) United States Patent
Agarwal et al.

(10) Patent No.: US 12,682,317 B2
(45) Date of Patent: Jul. 14, 2026

(54) OUT-OF-STOCK PREDICTION MODEL AND INTERVENTION METHOD

(71) Applicant: Uber Technologies, Inc., San Francisco, CA (US)

(72) Inventors: Tejaswi Agarwal, Sunnyvale, CA (US); Samuel Lite, Brooklyn, NY (US); Rishi Sadhir, Oakland, CA (US); Andrés Felipe Cádiz Vidal, Santiago (CL)

(73) Assignee: UBER TECHNOLOGIES, INC., San Francisco, CA (US)

( * ) Notice: Subject to any disclaimer, the term of this patent is extended or adjusted under 35 U.S.C. 154(b) by 262 days.

(21) Appl. No.: 18/487,619

(22) Filed: Oct. 16, 2023

(65) Prior Publication Data

US 2025/0124402 A1 Apr. 17, 2025

(51) Int. Cl.
| | |
|---|---|
| *G06Q 10/087* | (2023.01) |
| *G06N 20/00* | (2019.01) |

(52) U.S. Cl.
CPC .......... *G06Q 10/087* (2013.01); *G06N 20/00* (2019.01)

(58) Field of Classification Search
CPC ... G06Q 10/087; G06Q 30/0631; G06N 20/00
See application file for complete search history.

(56) References Cited

U.S. PATENT DOCUMENTS

| | | | |
|---|---|---|---|
| 2019/0236740 A1* | 8/2019 | Rao | G06Q 10/08 |
| 2020/0219171 A1* | 7/2020 | Zhuang | G06Q 30/0635 |
| 2023/0156158 A1* | 5/2023 | Moyne | H04N 23/60 348/159 |
| 2024/0177219 A1* | 5/2024 | Maharaj | G06Q 30/0631 |

FOREIGN PATENT DOCUMENTS

WO WO 2020142751 A1 7/2020

OTHER PUBLICATIONS

International Search Report and Written Opinion for Application No. PCT/US2024/051369, mailed Jan. 7, 2024, 8 pages.
Medium, "Predicting the real-time availability of 200 million grocery items", https://tech.instacart.com/predicting-real-time-availability-of-200-million-grocery-items-in-us-canada-stores-61f43a16eafe, retrieved on Jan. 16, 2024, 11 pages.

* cited by examiner

*Primary Examiner* — Florian M Zeender
*Assistant Examiner* — Kimberly S. Bursum
(74) *Attorney, Agent, or Firm* — Dority & Manning, P.A.

(57) ABSTRACT

Systems and methods for determining out-of-stock predictions for merchant items and performing intervention actions based on the out-of-stock predictions using machine-learned models. The method includes obtaining feature data including at least (i) aggregations of historical found rate data, (ii) item level metadata, and (iii) merchant signal data into an out-of-stock model. The method includes determining a number of output scores for a number of items. The output scores can be indicative of a likelihood of an item being out-of-stock. The method includes determining a first output score for a first item of the plurality of items satisfies an intervention criterion. The method includes responsive to determining the first output score satisfies the intervention criterion, performing an intervention action.

18 Claims, 8 Drawing Sheets

300

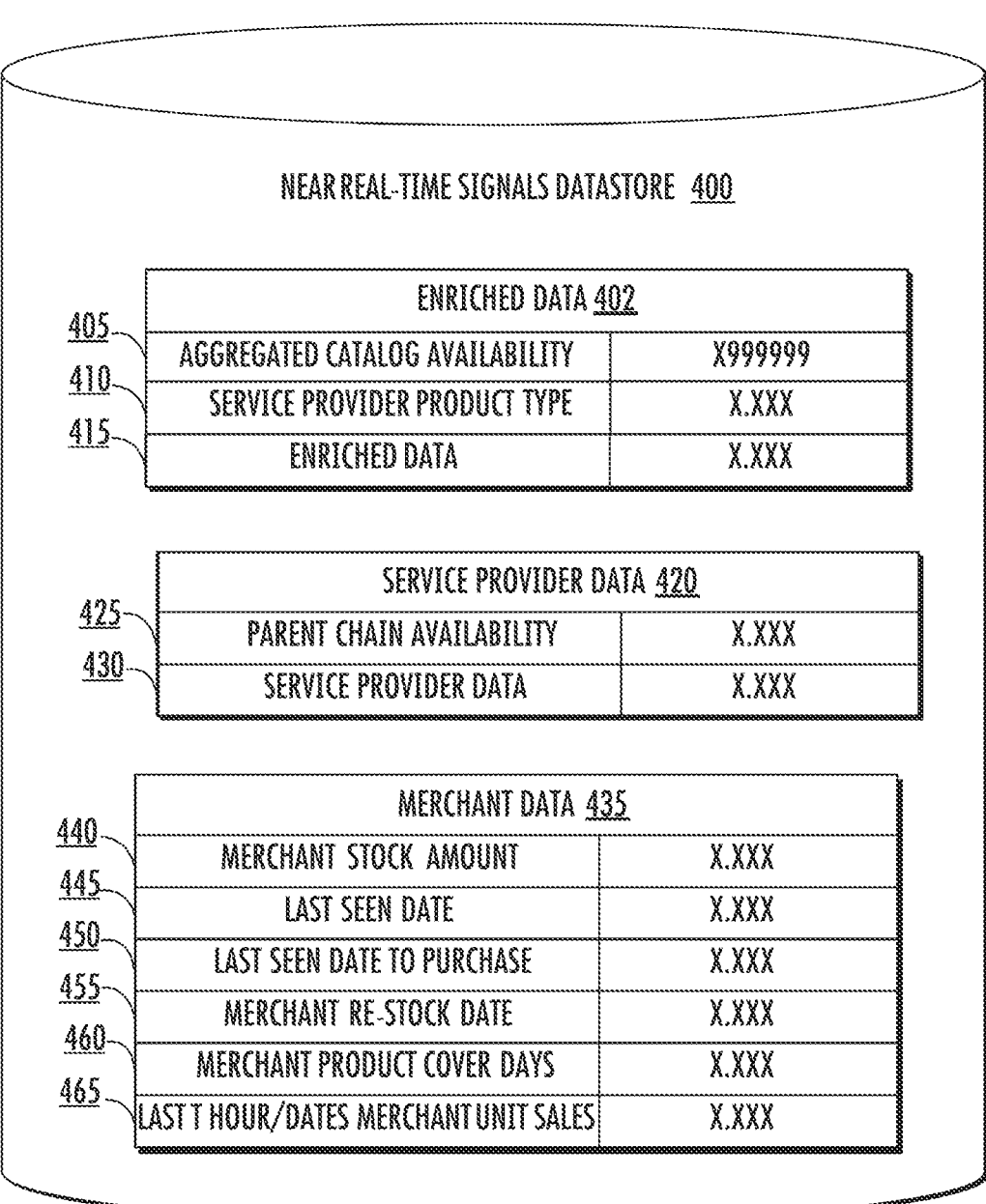

| NEAR REAL-TIME SIGNALS DATASTORE  400 | |
|---|---|

| ENRICHED DATA 402 | |
|---|---|
| AGGREGATED CATALOG AVAILABILITY | X999999 |
| SERVICE PROVIDER PRODUCT TYPE | X.XXX |
| ENRICHED DATA | X.XXX |

405
410
415

| SERVICE PROVIDER DATA 420 | |
|---|---|
| PARENT CHAIN AVAILABILITY | X.XXX |
| SERVICE PROVIDER DATA | X.XXX |

425
430

| MERCHANT DATA 435 | |
|---|---|
| MERCHANT STOCK  AMOUNT | X.XXX |
| LAST SEEN DATE | X.XXX |
| LAST SEEN DATE TO PURCHASE | X.XXX |
| MERCHANT RE-STOCK DATE | X.XXX |
| MERCHANT PRODUCT COVER DAYS | X.XXX |
| LAST T HOUR/DATES MERCHANT UNIT SALES | X.XXX |

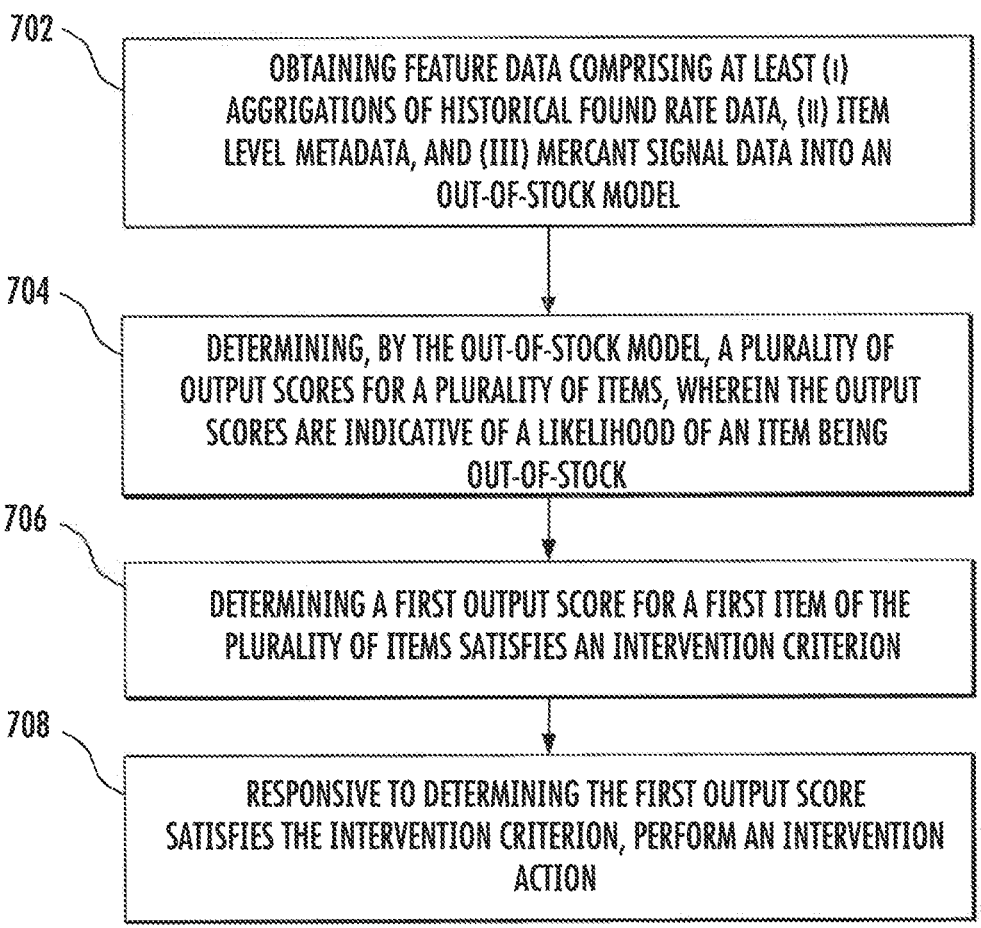

700

702 — OBTAINING FEATURE DATA COMPRISING AT LEAST (I) AGGRIGATIONS OF HISTORICAL FOUND RATE DATA, (II) ITEM LEVEL METADATA, AND (III) MERCANT SIGNAL DATA INTO AN OUT-OF-STOCK MODEL

704 — DETERMINING, BY THE OUT-OF-STOCK MODEL, A PLURALITY OF OUTPUT SCORES FOR A PLURALITY OF ITEMS, WHEREIN THE OUTPUT SCORES ARE INDICATIVE OF A LIKELIHOOD OF AN ITEM BEING OUT-OF-STOCK

706 — DETERMINING A FIRST OUTPUT SCORE FOR A FIRST ITEM OF THE PLURALITY OF ITEMS SATISFIES AN INTERVENTION CRITERION

708 — RESPONSIVE TO DETERMINING THE FIRST OUTPUT SCORE SATISFIES THE INTERVENTION CRITERION, PERFORM AN INTERVENTION ACTION

FIG. 7

OUT-OF-STOCK PREDICTION MODEL AND INTERVENTION METHOD

FIELD

The present disclosure generally relates to determining out-of-stock predictions for merchant items and performing intervention actions based on the out-of-stock predictions using machine-learned models.

BACKGROUND

Food delivery services allow a user to request a service that can be performed by a vehicle or courier. For instance, a user can request, through a delivery service application, a grocery delivery service having a pick-up location, a drop-off location, and items for delivery. A courier can be assigned to perform the grocery delivery service for the user. This can include selecting items from a pick-up location and transporting the items to a drop-off location.

SUMMARY

Aspects and advantages of embodiments of the present disclosure will be set forth in part in the following description, or can be learned from the description, or can be learned through practice of the embodiments.

One aspect of the present disclosure is directed to a computing system. The computing system includes one or more processors and one or more tangible, non-transitory, computer readable media that store instructions that are executable by the one or more processors to cause the computing system to perform operations. The operations include obtaining feature data including at least (i) aggregations of historical found rate data, (ii) item level metadata, and (iii) merchant signal data into an out-of-stock model. The operations include determining, by the out-of-stock model, a plurality of output scores for a plurality of items, wherein the output scores are indicative of a likelihood of an item being out-of-stock. The operations include determining a first output score for a first item of the plurality of items satisfies an intervention criterion. The operations include responsive to determining the first output score satisfies the intervention criterion, perform an intervention action.

Another Example aspect of the present disclosure is directed to a computer-implemented method. The method includes accessing a plurality of inventory listings associated with a plurality of merchants. The inventory listings including a plurality of items and plurality of quantities of the respective items. The method includes obtaining data including one or more features associated with the plurality of items. The method includes inputting the obtained data as input into an out-of-stock prediction model. The method includes generating, by the out-of-stock prediction model, a probability that a first item of the plurality of items is out-of-stock. The method includes determining, based on the probability that the first item of the plurality of items is out-of-stock, an intervention action. The method includes transmitting data including instructions that when read by a processor cause a computing device to perform operations, the operations including performing, the intervention action.

Yet another example aspect of the present disclosure is directed to one or more non-transitory computer readable media storing instructions that are executable by one or more processors to perform operations. The operations include obtaining feature data including at least (i) aggregations of historical found rate data, (ii) item level metadata, and (iii) merchant signal data into an out-of-stock model. The operations include determining, by the out-of-stock model, a plurality of output scores for a plurality of items, wherein the output scores are indicative of a likelihood of an item being out-of-stock. The operations include determining a first output score for a first item of the plurality of items satisfies an intervention criterion. The operations include responsive to determining the first output score satisfies the intervention criterion, perform an intervention action.

BRIEF DESCRIPTION OF THE DRAWINGS

Detailed discussion of embodiments directed to one of ordinary skill in the art are set forth in the specification, which makes reference to the appended figures, in which:

FIG. 4 depicts an example database according to example aspects of the present disclosure.

FIG. 7 depicts a flowchart diagram of an example method according to example aspects of the present disclosure.

DETAILED DESCRIPTION

Figure 1:
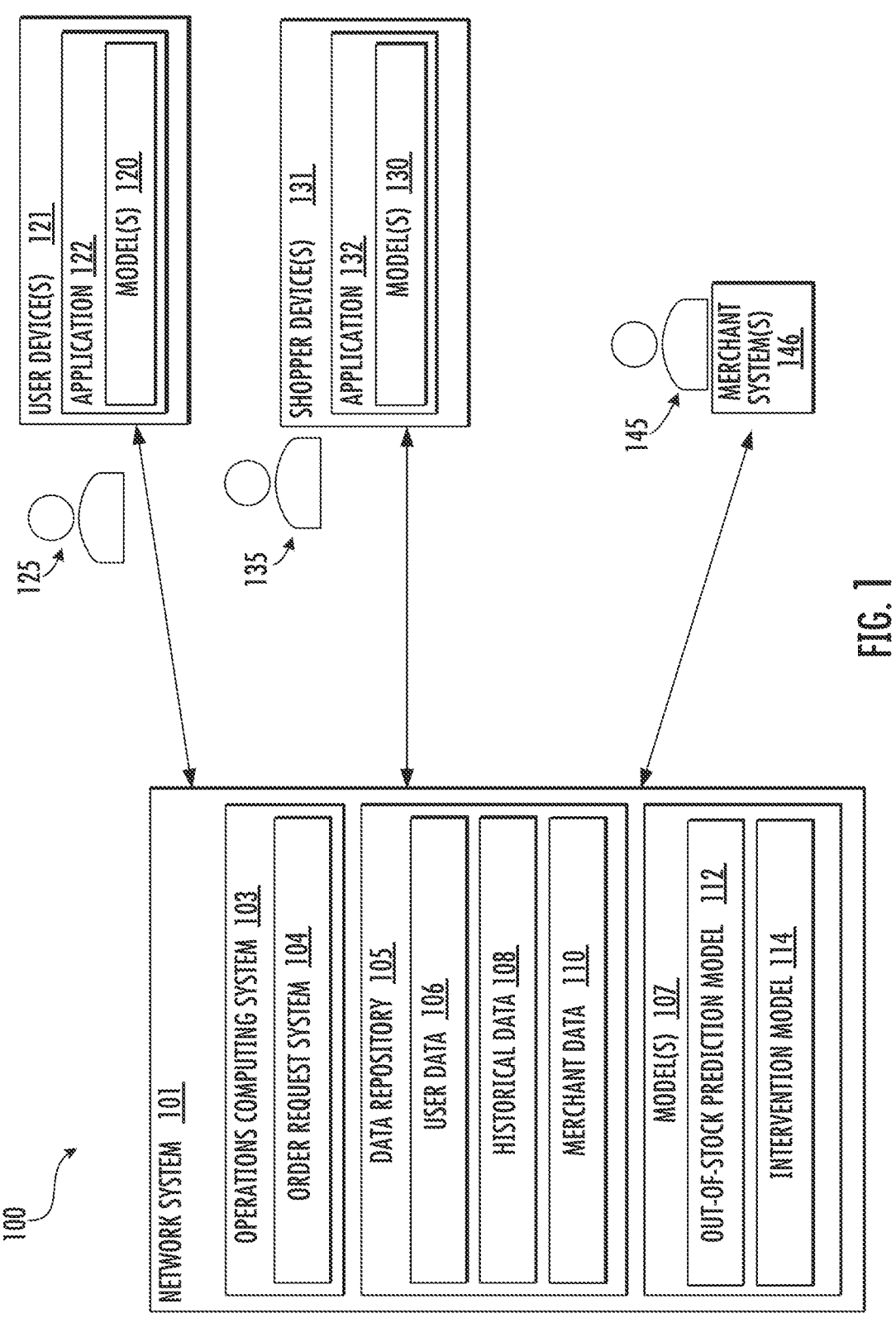
FIG. 1 depicts an example computing system according to example aspects of the present disclosure.

Generally, the present disclosure is directed to improved systems and methods for determining out-of-stock predictions for merchant items displayed via a software application and performing intervention actions based on the out-of-stock predictions. The present disclosure can provide for training, and the use of, an out-of-stock model (e.g., neural network) for determining a probability that an item will be out-of-stock. In response to determining that the probability that an item will be out-of-stock satisfies an intervention criterion, the system can determine and perform an intervention action, where applicable.

In a distributed computing environment for facilitating on-demand delivery of items provided at a variety of merchants, keeping an up-to-date accurate inventory of items available at the respective merchants is a problem with many associated technical hurdles. This can be due to unreliable inventory systems, unreliable timing of uploading of merchant inventory data, differentiating amounts of feature data shared by respective merchants, or other prevalent limitations that result in unreliable indications of current inventory across a number of merchants. Predicting items that will be out-of-stock allows for preemptive intervention methods to be used to reduce unnecessary computing resource utilization that can result from additional communications between a shopper device and a user device associated with initiating the service request. For instance, the present disclosure provides for removal (e.g., suppression) or badging of items that have a higher probability of being out-of-stock to prevent later computing resources being used for communication to determine a replacement item or notify a user that an item cannot be found. This can help preserve network bandwidth by reducing unnecessary data transmission as well as allowing a user device to better utilize its battery power.

Unlike inventory management on an individual merchant level, a service provider associated with delivery for multiple merchants does not have the ability to directly control stock availability in-store in the same way that a merchant can control inventory. Additionally, challenges arise as merchants, who can have thousands of items in a catalog, have varying levels of accessible data, non-uniform temporal updates to the data shared, and heterogenous data structures. This provides for a number of technical hurdles which require feature engineering to restructure the data, perform interpolations to fill in missing data, or develop customized methods for scaling the limited data received.

The present disclosure provides for an improved out-of-stock model for predicting the probability of items being out-of-stock. The out-of-stock model can be a machine learning model that is continuously trained based on feedback data as well as training data that can be generated by the service provider. The out-of-stock model can ingest feature data that can include aggregations of historical found rate data, item level metadata, merchant signal data, or other feature data. The out-of-stock model can generate an output including a probability that a respective item (associated with a particular merchant) is out-of-stock. Probabilities can be calculated for each item, of each merchant.

Based on the probability of a respective item satisfying an intervention criterion, the system can determine an intervention action to perform. The system can perform the intervention action which can include suppressing an item so as to prevent the item from being displayed via a user interface or removing the item from the catalog. Additionally, or alternatively, an intervention action can include providing for a badge associated with the item within the user interface with an indication that the item is likely out-of-stock.

The factors driving out-of-stock events can vary depending on the product category and store type. By analyzing these differences, tailored approaches to address out-of-stock issues in specific categories or stores are provided for in the present disclosure. Utilizing real-time data, such as current inventory levels and recent sales trends, can enhance the out-of-stock model's prediction of out-of-stock events which enables more proactive interventions. Additional external factors, like seasonality and promotional activities, can have a significant impact on out-of-stock events. The out-of-stock model can utilize signals associated with these factors to refine out-of-stock predictions and intervention strategies accordingly. Additional merchant-specific signals or data can be used to train the out-of-stock model to make personalized predictions on a merchant level.

The technology of the present disclosure can improve the process of predicting out-of-stock events based on sparse and heterogenous datasets. The technology of the present disclosure can provide a number of technical effects and benefits. For instance, aspects of the described technology can allow for more efficient use of computing resources by preemptively performing intervention actions to reduce bandwidth usage based on communications surrounding out-of-stock items. Additionally, the present disclosure provides for improved training methods for predicting out-of-stock events across diverse merchants with varying amounts of shared data and inconsistent data structures. The present disclosure can include a feedback loop for continuously training the model overtime as signals are obtained.

The technology described herein provides for many technical effects and benefits that address the challenges arising from limited access to inventory data for specific merchants. Additionally, the present disclosure can provide for unique opportunities for generating datasets based on the ability to perform real time or near-real time stock checks via shopper devices. For instance, the shopper devices can obtain image data associated with portions of a store to perform image processing to determine items that are in-stock or can otherwise obtain user input indicative of certain items being in-stock or out-of-stock at a respective merchant. Thus, the present disclosure provides for numerous technical effects and benefits that improve the functionality of a computing system (and its associated hardware) to deliver the operations and techniques described herein.

For example, the following describes the technology of this disclosure within the context of a server computing system for example purposes only. As described herein, the technology described herein is not limited to a server computing device and can be implemented for instance, on a user device or other computing device associated with a user or shopper and other computing systems.

FIG. 1 depicts an example computing system according to example aspects of the present disclosure. The example system 100 can include a network system 101, one or more users 125 associated with one or more user devices 121, one or more shoppers 135 associated with one or more shopper devices 131, and one or more merchants 145 associated with one or more merchant systems 146. In some examples the one or more merchants 145 can be associated with the shopper devices 131 (e.g., a designated shopper at a merchant location). The example system 100 can facilitate delivery services between the users 125 and the merchants 145 by utilizing shoppers 135 to retrieve requested items from merchant locations associated with the merchants 145. This can include, for example, a grocery delivery service that includes the retrieval of one or more grocery items.

With respect to examples as described herein, the system 100 can be implemented on a server, on a combination of servers, or on a distributed set of computing devices which communicate over a network such as the Internet. For example, the system 100 can be distributed using one or more servers and/or mobile devices. In other examples, the system 100 can be implemented as part of, or in connection with a network system 101, where, for example, operators (e.g., shoppers 135, couriers, etc.) use service vehicles to provide grocery delivery services for requesting users 125. In some examples, the system 100 can be implemented using mobile devices of users (e.g., user devices 121, shopper devices 131) associated with users 125, shoppers 135 and merchants 145 with the individual devices executing a corresponding service application (e.g., application 122, application 132) that causes the computing device to operate as an information inlet and/or outlet for the network system 101. In other examples, the system 100 can be implemented using one or more merchant systems 146 associated with one or more merchants 145. The merchant system 146 can operate as an information inlet and/or outlet for the system 100 to exchange data with the network system 101.

The network system 101 can include a number of systems and components for performing various operations. For example, the network system 101 can include an operations computing system 103, data repository 105, and one or more machine-learned models 107. The network system 101 can be any computing device that is capable of exchanging data and sharing resources. For example, the network system 101 can include one or more networked devices configured to store or transmit data over physical or wireless technologies. In some examples, the network system 101 can include hardware and software. In other examples, the network system 101 can include physical equipment that is connected to a physical network.

The network system 101 can include an operations computing system 103. In some examples, the operations computing system 103 can be implemented by one or more computing devices. For example, the operations computing system 103 can include one or more processors and one or more memory devices. The one or more memory devices can store instructions executable by the one or more processors to cause the one or more processors to perform operations or functions associated with other systems or components of the network system 101.

In some examples, the operations computing system 103 can include an order request system 104 configured to receive order requests from users 125 for grocery delivery services. For example, a user 125 can submit a grocery delivery service order request through an application 122 running on the user device 121 associated with the user 125. In some examples, the order request system 104 can receive a single grocery delivery service order request from a user 125. In some examples, the order request system 104, can receive multiple grocery delivery service order requests from multiple users 125. In some examples, the order request system 104 can coordinate multiple grocery delivery service order requests from the same user 125, which may require selection or delivery of grocery items from multiple merchant locations.

The order request system 104 can perform actions to coordinate a completion time of an order request including an estimated time of arrival for requested items. In some examples, where the merchant 145 or an individual associated with the merchant 145 is associated with the shopper device 131, the order request system 104 can coordinate actions to ensure a courier (e.g., individual delivering items to user 125) does not have to wait an extended period of time at the merchant location for the merchant 145 to prepare the order request. In other examples, the order request system 104 can determine if there are insufficient resources to complete the grocery delivery service order request. For example, insufficient resources can indicate there are no available couriers to deliver the requested grocery items. In some examples, the order request system 104 can reject a grocery delivery service order request if there are insufficient resources (e.g., shoppers 135, couriers, etc.) to complete the grocery delivery order request. In other examples, the order request system 104 can offer alternative solutions (e.g., a later time or day) if there are insufficient resources to complete the grocery delivery order request.

In some examples, the order request system 104 can provide data indicative of the grocery delivery service request to other systems and components of the network system 101 for further processing or storage. For instance, the order request system 104 can provide data indicative of the grocery delivery service request to the data repository 105. Data repository 105 can include, for example, datastores such as relational databases, non-relational databases, key-value stores, full-text search engines, message queues, etc.

The data repository 105 can include user data 106, historical data 108, and merchant data 110. Such data can be encrypted, stored in a secure manner, pseudonymized, or optionally collected (e.g., as selected by user 125). In some examples, the data repository 105 can be replicated to ensure the data stored in the data repository 105 is readily available for the plurality of user devices 121, shopper devices 131 and the merchant systems 146.

User data 106 can include data associated with the users 125 of the grocery delivery service entity. In some examples, user data 106 can include user profile information (e.g., name, address, payment information) and user preferences (e.g., essential grocery items, replacement grocery items, grocery item preferences, etc.) of the users 125. In other examples, user data 106 can include geographical information regarding the current location of the user device 121 associated with the user 125. For example, a user 125 can be on vacation and can be located in a different geographical location than the address associated with the user 125. For instance, user 125 can consent to providing user data 106 including the current geographical location of the user device 121 associated with the user 125.

Historical data 108 can include historical information associated with the users 125. For example, historical data 108 can include a previous grocery delivery service order requests (e.g., order history) that indicates items, merchant locations, and feedback from a user 125. In some examples historical data 108 can be specific to a user 125 (e.g., order history of a specific user 125). In other examples, historical data 108 can be an aggregate of historical information for a plurality of users 125 in a geographic region. Historical data 108 can be any relevant historical information associated with the usage of the grocery delivery service entity by the user 125.

Historical data 108 can include data associated with operations computing system 103. For instance, historical data 108 can include data aggregated from a parent chain of a merchant. For instance, parent chain data can include parent chain availability data associated with a number of merchant locations within a region. Historical data 108 can include an aggregated catalog that includes items availability across merchant locations. In some instances, historical data 108 can include data associated with sections or subsections of a grocery/merchant or enriched data. For instance, enriched data can account for items that are not purchased via the operations computing system 103. In some instances, raw data obtained from merchants can be sparse, the enriched data can provide for more useful data.

Merchant data 110 can include historical information associated with merchants 145. For example, merchant data 110 can include the history of the availability of specific grocery items at a merchant location, historical inventory trends (e.g., restocking times, low stock trends, etc.), completion time to prepare an order (e.g., shoppers 135 associated with the merchant location), etc. In some examples, merchant data 110 can be specific to a merchant 145 (e.g., grocery store chain) or merchant locations associated with the merchant 145 (e.g., a specific merchant location of a plurality of merchant locations). In some examples, merchant data 110 can include previous out-of-stock or in-stock data for grocery items at a merchant location. For example, a merchant location can update or change feature data stored with associated grocery items available at the merchant location. In some examples, merchant data 110 can include the historical map data for merchant locations. In other examples, merchant data 110 can be an aggregate of historical information for all merchants 145 and merchant locations in a geographic region. In some examples, merchant data 110 can include historical data associated with a particular grocery item available across multiple merchant locations (e.g., a grocery item associated with a particular SKU's availability over a certain amount of time over a certain number of merchants).

Merchant data 110 can include one or more signals associated with a merchant 145 or group of merchants. Merchant data 110 can include a listing of each item in a catalog and feature data associated with each respective item. The feature data can include, for instance, an indication of an item being out-of-stock or an item being in-stock, historical demand, product cover days, trailing number of sales per day, frequency of an item being in-stock versus out-of-stock, the last time the respective item was in-stock at this store over a predetermined number of weeks, or other relevant feature data. Merchant data 110 can be broken down into specific merchant locations, in some instances, merchant data 110 can include aggregations of data across merchant locations associated with a single merchant or across merchants (e.g., stores with different brands or names).

In some instances, merchant data 110 is raw data pulled from one or more computing resources associated with the respective merchants 145. Additionally, or alternatively, merchant data 110 can include data that has undergone feature engineering to normalize the data. For instance, if signals from different merchants 145 are obtained at irregular or inconsistent cadences, it can be necessary to perform operations to make the available data more comparable. For example, an extrapolation of available data can be made, or data can be pulled forward until new data is obtained.

In some examples, the data repository 105 can be updated by user devices 121, the shopper devices 131, and the merchant systems 146. For example, as the user 125 submits, via application 122 running on the user device 121, a grocery delivery service order request, the data repository 105 can be updated to reflect the grocery delivery service order request. In some examples, the shopper device 131 can update, via the application 132 running on the shopper device 131, the data repository 105 by providing updates (e.g., item unavailable, shopping complete, etc.) associated with the delivery service order request. In other examples, the merchant systems 146 can update the data repository 105 to reflect changes such as inventory levels at merchant locations, operating hours of the merchant locations, etc. The data repository 105 can be updated dynamically (e.g., as events occur) or can be updated on a scheduled reoccurring basis.

In some examples, one or more machine-learned models 107 can utilize the data stored in the data repository 105. By way of example, the one or more models 107 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

For example, the one or more models 107 can include a machine-learned orchestration model trained to process request data (e.g., user data 106 including user preferences, order request, etc.), merchant data (e.g., merchant data 110 including the store layout, location of grocery items relative to the layout, etc.), and data signals from computing devices within the merchant to generate output indicative of one or more predictions about a number of items being in-stock or out-of-stock and determining an intervention action to perform. Data signals can include any pulse, frequency, electromagnetic, or electrical current that carries data from one system or network to another. In some examples, data signals can be generated from computing devices (e.g., mobile computing devices) located within the merchant location. Data signals can be communicated directly between devices. In some implementations, data signals can be communicated indirectly, through an intermediate system. For instance, multiple shoppers 135 located in the same merchant location can generate and transmit data signals to the network system 101 indicating contextual information associated with the merchant location. In some examples, data signals can indicate an updated location of a requested item, the availability (e.g., in-stock, out-of-stock, etc.) of a requested item, a level of activity within the merchant location, and the like. An example of data signals within a merchant location is further described with reference to FIG. 7.

In some examples, the one or more models 107 can include an out-of-stock prediction model 112 and an intervention model 114. The out-of-stock prediction model 112 can be a machine-learned model trained to generate one or more out-of-stock predictions (e.g., output scores) for one or more items in a merchant catalog. The out-of-stock prediction model 112 can utilize user data 106, historical data 108, or merchant data 110 as input to generate the one or more out-of-stock predictions. The out-of-stock predictions can be utilized as input into the intervention model 114 alongside user data 106, historical data 108, or merchant data 110 to generate an output including a recommendation for an intervention action associated with one or more items in a merchant catalog. For instance, the intervention actions can include removing an item from a catalog, providing a notification that the item is likely out-of-stock, recommending an alternative item, or some other intervention action. In some instances, the intervention model 114 can output command instructions to generate a user interface of the user device 121 that prevents the display of an out-of-stock item or causes some other visual indication associated with the likelihood that the item will be out-of-stock.

In other examples, the intervention model 114 can be trained to generate one or more replacement item suggestions based on user preferences (e.g., user data 106) that indicate replacement items for unavailable requested items. For example, the user 125 can indicate a replacement item that should be selected in the event a requested item is unavailable (e.g., out-of-stock). In some examples, the user preference for replacement items can be included in request data and utilized by the machine-learned intervention model 114 to generate an intervention action responsive to a likelihood of an item being out-of-stock exceeds a predetermined amount. In some examples, the intervention model 114 can output command instructions that generate a user interface of the user device 121 that causes an item not to be displayed, causes a visual indication of the item's likelihood of being out-of-stock, or a recommendation for a replacement item. An example of the machine-learned out-of-stock model prediction 112 and intervention model 114 is further described with reference to FIG. 2 and FIG. 5 to FIG. 7.

As indicated, the system 100 can include various users 125 and user devices 121. The users 125 can include individuals, or a group of individuals associated with a user profile configured to interact with the grocery delivery service entity. In some examples, the users 125 can utilize a guest profile (e.g., one time use) to interact with the grocery delivery service entity.

The user device 121 can include a mobile computing device, such as a smartphone, tablet computer, laptop computer, VR or AR headset device, and the like. As such, the user device 121 can include components such as a microphone, a camera, a satellite receiver, and a communication interface to communicate with external entities using any number of wireless communication protocols. In some examples, the user device 121 can store a designated service application (e.g., application 122) in a local memory. In some examples, the memory can store additional applications executable by one or more processors of the user device 121, enabling access and interaction with one or more host servers over one or more networks. In some examples, user devices 121 can communicate with the network system 101 over one or more networks.

The user device 121 can be associated with the user 125 and allow the user 125 to interact with the grocery delivery service entity (e.g., network system 101). For example, in response to user input by the user 125, the application 122 can interact with the user device 121 to display an application interface on a user interface of the user device 121. In some examples, the user 125 can select items (e.g., via a touch or cursor user input) and submit a grocery delivery service order request through the application 122 running on the user device 121. In some examples, the user 125 can view order updates (e.g., order in progress, complete, unavailable items, etc.) on the user interface of the user device 121. In some examples, the user 125 can view an ETA (estimated time of arrival) for the order request.

In some examples, the user device 121 can receive data from the network system 101. For example, the application 122 can receive data stored in the data repository 105 of the network system 101. In some examples, the application 122 can interact with the user device 121 to display the historical data 108 associated with the user 125 (e.g., a user's order history). In some examples, the application 122 can interact with the user device 121 to display merchant data 110 (e.g., available grocery items at a merchant location). In other examples, the application 122 can interact with the user device 121 to display user data 106 including user preference selections, related grocery items, and suggestions for grocery items that are likely to be desired by the user 125.

In some examples, the user device 121 can transmit user data 106 to the network system including user preference data. For example, a user 125 can indicate preferences for requested items. User preference selections can include replacement grocery items (e.g., one or more acceptable alternatives if an initially selected item is unavailable). For example, a user 125 can indicate user preference selections indicating organic whole milk as a suitable replacement item for 2% milk.

In some examples, the user device 121 can receive data from the network system 101 including intervention action data. Intervention action data can include a command to cause a user interface of user device 121 to update to remove or adjust display of one or more grocery items that are determined to likely be out-of-stock. For instance, removing the one or more grocery items that are determined to likely be out-of-stock can result in the item not being surfaced via the user interface. By way of example, when searching for an item, such as milk, if 2% milk is determined to likely be out-of-stock, 2% milk will not be displayed as a search result, however other milk options (whole, skim, oat, almond) can be provided for display as results. If a user provided input explicitly searching for 2% milk, the system can provide a result indicating that the 2% milk is out-of-stock and cannot be added to an order. In some instances, the intervention action can be providing a badge or alternative recommendation based on an item that is likely to be out-of-stock. For instance, related grocery items can be determined and can be provided as suggestions for replacement items.

By way of example, related grocery items can include items that are generally related to items included in the order request. Suggestions for grocery items can include suggestions based on previous order requests. For instance, suggestions for grocery items can include one or more items that have previously been included in an order request with an item included in the current order request. In some examples, suggestions for grocery items and replacement items can include one or more items from previous order requests for the requesting user 125. In other examples, suggestions for grocery items and replacement items can include one or more items from previous order requests from an aggregate of users 125. In some implementations, this type of information can be included in user data 106.

In some examples, the one or more models 107 can determine the user preference selections, the related grocery items, the suggested grocery items, and replacement items. For example, the one or more models 107 can include an out-of-stock prediction model 112 trained to determine a probability that an item in a catalog is out-of-stock. The one or more models 107 can include an intervention model 114 trained to determine or initiate an intervention action based on the probability predicted by the out-of-stock prediction model 112.

For example, the out-of-stock prediction model 112 can determine, based on historical data 108 or merchant data 110, a likelihood that an item is going to be out-of-stock at a merchant location. In some instances, the intervention model 114 can be used to determine an intervention.

In some examples, the user device 121 can obtain data including command data from the network system 101. For example, the application 122 can interact with the user interface of the user device 121 to display selectable options for the user 125. For example, the application 122 can interact with the user device 121 to display one or more available items or recommended items. In some instances, the intervention model 114 can determine an intervention action based on predictions from out-of-stock prediction model 112.

In some examples, the user 125 can indicate a preference that requested items are replaced if determined to be out-of-stock by interacting with (e.g., adjusting, sliding, swiping, typing, etc.) an interactive priority user interface element (e.g., button, menu) on the display of the user device 121. In some examples, the user 125 can indicate (e.g., prior to submitting an order request) that user preferences should be used for all future order requests. For example, the user 125 can indicate (e.g., prior to submitting an order request) that user preferences should only be used for a current order request. For instance, the application 122 can interact with the user device 121 to display user preference options and the user 125 can select a user interface element to indicate that user preference selections are only for the current order request. In other examples, the user 125 can opt to not save the user preference selections.

In other examples, the user 125 can update previously saved user preferences. For example, the application 122 can interact with the user interface of the user device 121 to display saved user preference options. The user 125 can indicate updated user preferences by updating an item preference user interface element. For example, the user 125 can indicate an updated user preference to replace organic whole milk with non-organic whole milk by interacting with (e.g., adjusting, sliding, swiping, typing, etc.) an interactive replacement item user interface element (e.g., button, menu) on the display of the user device 121.

In some examples, user data 106 can include user preferences. The user preference selections can be transmitted over one or more networks and stored in a data repository 105 of the network system 101. In some examples, the user preference selections can be used as input data to the one or more models 107 of the network system 101.

The system 100 can include shoppers 135 and shopper devices 131. A shopper 135 can be used to retrieve requested grocery items from a merchant location or to perform real-time inventory checks. In some examples, the shopper 135 can include the courier (e.g., individual transporting requested grocery items), or an individual associated with the merchant 145 (e.g., a designated shopper at a merchant location). The shopper device 131 can include a mobile computing device, such as a smartphone, tablet computer, laptop computer, VR or AR headset device, and the like. As such, the shopper device 131 can include features such as a microphone, a camera, a satellite receiver, and a communication interface to communicate with external entities using any number of wireless communication protocols.

In some implementations, the shopper device 131 can be a courier device via which a courier receives data associated with the delivery service order request. This can include instructions for traveling to a merchant location associated with one or more merchants 145, items selected by a user 125, instructions to perform a real-time inventory check, etc.

In some implementations, the shopper device 131 can be a mobile computing device associated with a merchant location. This can include a dedicated tablet, phone, etc. that is utilized by a shopper 135 within the merchant location. The shopper device 131 can receive, for a merchant 145, data that is associated with the delivery service order request. This can include items selected by a user 125, pick-up times, etc. In some implementations, a shopper device 131 can be communicatively connected to a computing system of the merchant location (e.g., inventory systems, POS systems, etc.).

In some examples, the shopper device 131 can store a designated service application (e.g., application 132) in a local memory. In some examples, the memory can store additional applications executable by one or more processors of the shopper device 131, enabling access and interaction with one or more host servers over one or more networks. In some examples, shopper devices 131 can communicate with the network system 101 over one or more networks.

Shopper devices 131 can be associated with shoppers 135 and allow the shopper 135 to interact with the grocery delivery service entity. For example, in response to user input by a shopper 135, an application 132 can interact with the shopper device 131 to display an application interface on a user interface of the shopper device 131.

In some examples, the shopper device 131 can receive, over one or more networks, data from the network system 101. For example, the application 132 can receive data stored in the data repository 105. In some examples, the application 132 can interact with the shopper device 131 to display merchant data 110 (e.g., map data, merchant location, item locations within merchant location relative to map data, etc.). In other examples, the application 132 can interact with the shopper device 131 to display user data 106 (e.g., user preferences, priority items, etc.).

In some examples, the shopper device 131 can transmit data to the network system 101. For example, the application 132 can interact with the user interface of the shopper device 131 to display the requested grocery items, user preference selections of the user 125 (e.g., priority items, ripeness level, etc.), and one or more real-time inventory check assignments for one or more grocery items that has not been requested. In some examples, the shopper device 131 can indicate that a requested grocery item has been found or has not been found. This data can be used to determine a performance rate of the out-of-stock prediction models. In some examples, the shopper device 131 can receive user input of the shopper 135 and transmit output indicative of status (e.g., selected or disregarded) of the grocery item to the network system 101 where the output can be stored in the data repository 105 of the network system 101.

In some examples, the output indicative of the status of the grocery item can include a data signal indicating that the grocery item is in-stock or out-of-stock. For instance, the user interface of the shopper device 131 can display an interactive user interface element that allows the shopper 135 to indicate the item cannot be found. In some examples, the status of the grocery item can include a data signal indicating that there is a high activity level in an area proximate to the grocery item. For instance, a shopper 135 can encounter a long line at a butcher counter to select fresh meat for the order request. In other examples, the output indicative of the status of the grocery item can include a data signal indicating that the grocery item is unavailable.

In some examples, the shopper device 131 can transmit data to the network system 101. For example, the application 132 can interact with the user device 121 to indicate updates associated with the order request. For example, the shopper 135 can provide updates indicating that an item has been found or a grocery item is unavailable (e.g., out-of-stock) and an alternative item has been selected. The updates associated with the unavailable item can be transmitted over one or more networks and stored in a data repository 105 of the network system 101. In some examples, the updates can be used by the one or more models 107 of the network system 101 output command instructions to update the user interface of the user device 121 to provide an interface based on the out-of-stock prediction or intervention action selected.

The system 100 can include merchants 145 and merchant systems 146 that operate as an information inlet and/or outlet for the system 100 to exchange data with the network system 101. Merchants 145 can include any person or company involved in the trade or sale of items (e.g., grocery items). Merchants 145 can be associated with merchant locations (e.g., physical locations, grocery stores, etc.) where grocery items can be purchased. Example merchant locations include conventional supermarkets, limited assortment supermarkets, supercenters, warehouse clubs, or convenient stores. In some examples, merchants 145 can be associated with shopper devices 131. For example, merchants 145 can offer shopper services (e.g., a designated shopper at a merchant location) to select grocery items requested using the grocery delivery service entity. In some examples, merchants 145 associated with a shopper device 131 can perform similar operations as a shopper 135 as described herein.

Merchant systems 146 can be associated with one or more merchants 145. Merchant systems 146 can include a record for each merchant 145 subscribed to the grocery delivery service entity as well as associated merchant locations. By way of example, the merchant systems 146 can aggregate inventory data for each respective merchant location to define grocery items that are available at each merchant location associated with the respective merchants 145. In some examples, merchant systems 146 can include enriched data associated with each merchant 145 which can improve the utility of the available inventory data. Example merchant data 110 can is further described with reference to FIG. 4.

In some examples, the merchant systems 146 can include the location (e.g., shelf, aisle number, section of store, etc.) of grocery items that are available within each specific merchant location. The merchant systems 146 can be updated by the merchants 145 to reflect the most up to date inventory levels at the respective merchant locations associated with the merchants 145. In some examples, the merchant systems 146 can synchronize within inventory management software, point-of-sale systems, etc. of one or more merchants 145 to maintain accurate levels of inventory at each respective merchant location.

In some examples, merchant systems 146 can transmit merchant data 110 to the network system 101. For example, a merchant system 146 can be updated (e.g., by an individual associated with the merchant 145, automatically, etc.) to indicate that a particular item is no longer available at a merchant location associated with the merchant 145. In some examples, a merchant system 146 can be updated to indicate that previously unavailable grocery items are now available at a merchant location associated with the merchant 145. The merchant system 146 can transmit the updated merchant data 110 indicating the change in inventory to the network system 101. In some examples, the merchant system 146 can transmit updated inventory data indicating a comparison between predicted out-of-stock data from models 107 and inventory data or real-time inventory check data obtained from a shopper device 131. In some examples, the network system 101 can utilize the updated merchant data 110 for processing order requests from users 125 of the grocery delivery service entity, training models 107, or generating out-of-stock predictions for one or more grocery items.

As described herein, the network system 101 can include an out-of-stock prediction pipeline and an intervention action pipeline as described with reference to FIG. 2.

Figure 2:
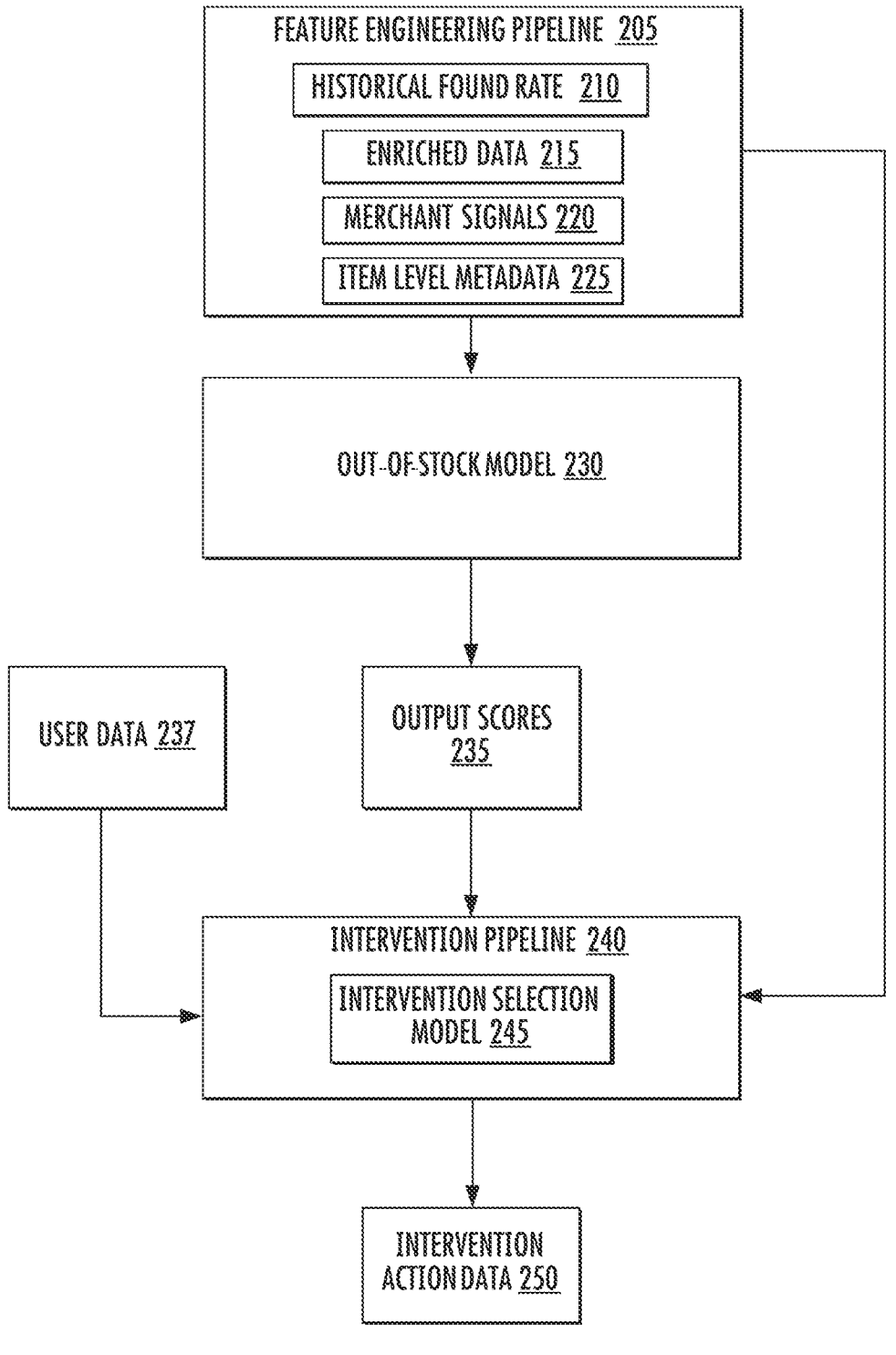
FIG. 2 depicts a block diagram of an example data processing pipeline according to example aspects of the present disclosure.

FIG. 2 depicts an example data flow pipeline for obtaining signals in a feature engineering pipeline 205 to be provided as input into out-of-stock model 230. The out-of-stock model 230 can generate output including a plurality of output scores 235 for each respective item of a merchant catalog. The output scores can be values (e.g., numeric, or Boolean) indicative of a prediction of the respective items being in-stock or out-stock. In some instances, the prediction can be a number between 0 and 1 representing a likelihood that a grocery item is out-of-stock. The output scores 235 and user data 237 can be used by intervention pipeline 240 to generate intervention action data 250. Intervention action data 250 can include a determined intervention action or commands which cause a user interface of a user device to perform the intervention action. For instance, the commands can cause the user interface of the user device to provide for display certain information, suggested items, indications of out-of-stock items, or perform other intervention actions.

Feature engineering pipeline 205 can obtain raw signals from a plurality of sources and perform feature engineering operations to render the raw signals useful in determining out-of-stock probability predictions. Feature engineering pipeline 205 can include aggregations of historical found rate 210, enriched data 215, merchant signals 220, item level metadata 225, or other relevant merchant or inventory related data (e.g., data described in data repository 105 or near real-time signals datastore 400).

Feature engineering pipeline 205 can include data that the system has engineered, enriched, or otherwise adjusted. For instance, feature engineering can be performed based on a cadence of data updates, discrepancies in available data, or other processes to transform the data into a form that allows for more efficient processing. For instance, a portion of merchants, items, or requesters can be segmented. By way of example, a segmented portion can be treated as a holdout, or control, group. The portion of segmented merchants, items, or requesters can be uncensored or unaltered based on the out-of-stock predictions (e.g., not subject to intervention actions). For instance, if a portion of requesters were segmented, the system could generate a censored set of data (e.g., catalog subject to intervention actions) and an uncensored set of data (e.g., catalog not subject to intervention actions).

For instance, some feature data can be obtained at an irregular cadence. In some implementations, the feature data can have a freshness guarantee of 24-48 hours. A freshness guarantee can be indicative of a guarantee of how often a certain set of feature data will be updated (e.g., how often data or signals are obtained by feature engineering pipeline 205). However, the system needs to extrapolate to account for irregularly obtained feature data to make the feature obtained from different sources comparable, and thus capable to be used by out-of-stock model 230 to generate output scores 235. For instance, a store that updates feature data every 24 hours needs to be comparable to a store that updates feature data every 3 hours or 12 hours.

When the raw data is pulled from the sources, or otherwise accessed by the feature engineering pipeline 205, by a raw data obtaining component, the raw data obtaining component can generate a data structure including a UUID, store data, and a label of out-of-stock or in-stock for the item. The feature data can include, for example, data indicative of UUID, location, in-stock or out-of-stock label, or other features. These features can be obtained in near real time. The data structure that is generated can be transmitted to a hive database which can store data including the UUID and an in-stock or out-of-stock label. The database can include a universal features store. The universal features store can be accessed by the system to perform offline model training or prediction.

In some implementations, the holdout group can be determined using controlled randomization. For instance, the holdout group be randomly selected in such a way that the holdout group includes a selection of merchants that have a comparable feature distribution to the remaining merchants (e.g., based on cuisine type, size, price, location, or other relevant features). However, generating a holdout group that is representative of the entire group of available stores presents technical challenges due to the small number of stores. This can be solved by generating a controlled randomly selected holdout group. Where the controlled randomly selected holdout group is selected such that the group is representative of the entire group of available stores based on characteristics of the respective merchant locations.

Historical found rate 210 can include an indication of a value associated with how often one or more items are found and respective merchant locations. For instance, an item, such as sour gummies can have a different found rate at a particular grocery store brand than a convenience store. As such, a historical found rate 210 can be stored for each item at each respective merchant. The historical found rate 210 can be numerical value indicating the number of times the item has historically been found. For instance, this can include a percent, a proportion, or some other numerical value.

Enriched data 215 can include an aggregated catalog including data of in-stock or out-of-stock availability across multiple merchant locations. For instance, if a search is performed for bananas, the availability of bananas can be determined for a number of stores within a geographic region opposed to only populating catalog information for a single merchant location. Enriched data 215 can include a category or subcategory designation for the plurality of items. For instance, a category can be bread, and subcategories can include types of bread, for example sourdough, wheat, or brioche. The category or subcategory of items can be used to determine trends across categories of item in-stock availability.

Enriched data 215 can include loosely linked item data. Loosely linked item data can include data that includes pairs or groups of items that can be stored as related. In some instances, in addition to the items being stored as related, an indication of how the items have been linked can also be stored. The loosely linked items can include items which have inventory that can affect availability of other items. For instance, graham crackers, marshmallows, and chocolate bars can have a loose link. Similarly, limes and salt or other pairs of items that can be purchased together (e.g., as ingredients of a dish or recipe).

Merchant signals 220 can include merchant stock quantity, last seen date, merchant restock data, merchant product cover days, or last trailing hour or day unit sales. Merchant stock quantity can be a merchant-provided number of the respective item that is in-stock. The last seen date can be a date associated with the last time the merchant marked the item as in-stock. Merchant restock data can include an expected restock schedule, prior restock patterns, or an indication of the most recent restock of an item. Merchant product cover days can include an estimated number of business days' worth of an item is in stock according to a merchant stock quantity and historical demand. Last trailing hour or day unit sales can include an indication of demand over the past X number of hours or days. For instance, how many bags of sour gummies have been purchased in the past 3 hours or 10 days. The trailing hour or day number can be selected based on merchant or item characteristics.

Feature engineering pipeline 205 can provide data in a format that is ingestible by out-of-stock model 230 to predict a likelihood that a grocery item is out-of-stock. In some instances, out-of-stock model 230 can receive additional data as input used in determining the output scores 235. For instance, the additional input data can include, for instance, near real-time item check data obtained from shopper devices. For instance, as described herein, the system can determine the location of one or more shopper devices. Based on the shopper device location, the system can transmit a request to a shopper device to perform an inventory check for one or more items that are expected to be in-stock or out-of-stock at the location of the shopper device.

In some instances, real-time inventory checks can be performed using image processing. For instance, a shopper device can receive a request to take a photograph of a particular portion of a merchant location (e.g., aisle, bin, display). The photograph can be processed on-device or transmitted off-device for processing. Image processing can be performed to determine a Boolean value of an item being in-stock or out-of-stock. Additionally, or alternatively, image processing can include determining a quantity of one or more items in the image. As described herein, the real-time (e.g., near real-time) inventory checks can be used as training data for the out-of-stock model 230 or intervention pipeline 240.

The out-of-stock model 230 can include one or more machine-learned models that have been trained to predict grocery items' likelihood of being out-of-stock. In some instances, out-of-stock model 230 can be trained, using, for example, a feedback loop, based on a comparison of predictions of out-of-stock items to ground truth data (e.g., obtained via shopper input, near real-time inventory checks (e.g., as described herein), or some other manner of obtaining ground truth data of an item being out-of-stock or in-stock).

The grocery item output scores 235 (e.g., predictions of an item's likelihood of being out-of-stock) can be utilized as input into intervention pipeline 240. Additionally, or alternatively, intervention pipeline 240, can obtain user data 237 as input. Intervention pipeline 240 can include intervention selection model 245. Intervention selection model 245 can determine an intervention action based on the output scores 235, user data 237, or data obtained via feature engineering pipeline 205. User data 237 can include, for instance, user preference data, user order history, data associated with a current "cart" of a user, or other user data. In some implementations, user data can include user session data or historical user data. Historical user data can include, for example, one or more user preferences, one or more prior orders, or one or more frequently ordered items. In some instances, data obtained from feature engineering pipeline 205 can include predicted demand, historical demand trends, or other data associated with item demand. Intervention selection model 245 can generate intervention action data 250 as output.

For instance, intervention selection model 245 can determine an intervention action based on the obtained user data 237, output scores 235, or data associated with feature engineering pipeline 205.

Intervention action data 250 can include at least one of instructions to remove an item from a catalog of a merchant associated with the first item or provide for display a notification via a user interface of a user device. In some instances, the notification can include at least one of a message indicative of the first item likely being out-of-stock or one or more substitution recommendations. For instance, an intervention action can include removing an item from a catalog, flagging the item as likely to be out-of-stock, or recommending an alternative option. The intervention action selected or recommended can vary based on user preferences, overall system demand, predicted system demand, historical trends in demand, or other relevant signals.

Removing an item from a catalog can include removing the first item such that the first item is inaccessible via an in-application query. For instance, a user cannot search for the item and find a response including the item. The interface could provide a message such as "no results found" or "try searching for X instead."

In some instances, a notification intervention action can include providing an indication that an item is either out-of-stock or is likely to be out-of-stock. For instance, if an item has not been found in over seven days and a merchant has provided data indicative of the item being out-of-stock, the intervention action can be determined to be providing a notification that the item is out of stock. However, if there is ambiguous data about the item being in or out of stock, such as an expected product cover time running out but another signal indicating that an item is in stock, the system may provide a notification that the item is likely to be out-of-stock, and depending on user data or other input data provide one or more recommended replacement items for display.

Figure 3:
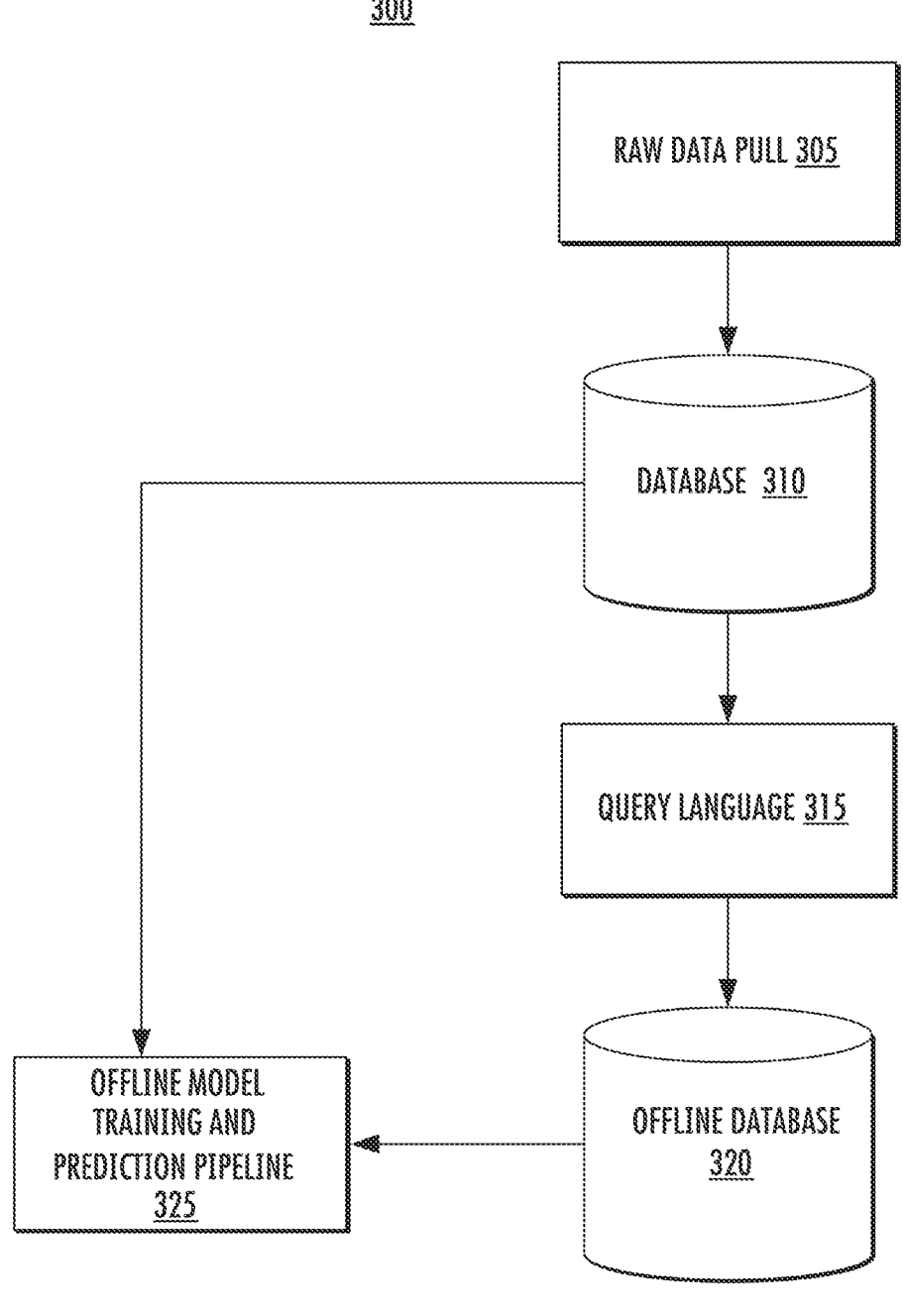
FIG. 3 depicts a block diagram of an example data processing pipeline according to example aspects of the present disclosure.

As described herein, the models (e.g., out-of-stock prediction model and intervention model) can be trained offline or online. FIG. 3 depicts an example data flow 300 for offline training of one or more models. For instance, data flow 300 can include obtaining or aggregating raw data via a raw data pull 305. The data pulled in raw data pull 305 can be enriched, extrapolated upon, or otherwise processed or transformed by the computing system and stored in database 310. Database 310 can include a variety of data including data described in FIG. 4.

The data from database 310 can be used directly for offline model training and prediction pipeline 325 or being processed by a query language 315 and stored in an offline database to be utilized for offline model training and prediction pipeline 325. In some implementations, Hibernate Query Language (HQL) can be used. The result of processing the database 310 by the query language 315 can result in generation of data stored in offline database 320.

The data stored in offline database 320 can be utilized alternatively to, or in addition to, the data stored database 310 data by the offline model training and prediction pipeline 325. For instance, the query language can sort the data from database 310 to be used by offline model training and prediction pipeline 325 for various purposes. For example, the sorted data in offline database 320 can be used for data preprocessing, feature engineering, data splitting, balancing classes, efficient training, optimizing learning rate, hyperparameter turning, time series forecasting, windowing techniques, or other uses to enhance the efficiency and effectiveness of the offline machine-learned model training. These uses can be particularly advantageous for training a model that has time-dependent or sequential data like inventory which can fluctuate and values of one item can impact either directly or indirectly the in-stock or out-of-stock likelihood of other items. Thus, utilizing the sorted data in offline training can provide for improved processing and reduction of computing resource utilization.

In some implementations, a portion of the data stored in offline database 320 can be segmented and used as a holdout group to avoid the out-of-stock model or intervention model from becoming unbalanced (e.g., due to items being removed from a catalog that would otherwise be labeled as out-of-stock).

In some instances, machine-learned model training can include generating a training data structure based on shopper device data. For instance, the training data structure can be generated by the system by obtaining data from one or more shopper devices. The system can process the obtained data to determine if one or more items are out-of-stock. Generating a data structure can include obtaining user input indicative of at least: (i) one or more items and (ii) an out-of-stock indication of each respective item of the one or more items. The generated training data structure can include at least (i) the one or more items and (ii) the out-of-stock or in-stock indication for each respective item of the one or more items.

In some implementations, the training data structure can be generated in near real-time. For instance, the training data can be generated by obtaining data indicative of a location of a shopper device within a merchant location. In response to obtaining the data indicative of the shopper device location, the system can determine a first item for an item check. For instance, if a shopper device location is indicative of the device being in the cereal aisle, the system can generate a real-time item check for one or more types of cereal. The system can generate a request for a real-time item check. The system can transmit the request for the real-time item check to the shopper device. The system can obtain response data including an indication of an item being in stock or out-of-stock. For instance, the shopper can provide input indicative of an item being in or out of stock. The system can generate a data structure including at least (i) the one or more items and (ii) the out-of-stock or in-stock indication for each respective item of the one or more items.

In some implementations, a shopper device can obtain direct user input (e.g., free form text, selection of a button or other user interface element) or a shopper device can capture an image of a portion of a store (e.g., aisle) and the image can be processed as described herein.

The generated training data can serve as a real-time ground truth dataset. For instance, the training data can include a basis table. The basis table can include, for instance, a foundational set of unique item identifiers (UUIDs) relating to features to predict or learn from. For instance, the table can include a plurality of UUIDs associated with distinct items that are in merchant inventories, for each UUID, the system can include one or more features and an out-of-stock or in-stock label.

The system can additionally generate a prediction baseline table. The out-of-stock model can generate a prediction for all UUIDs within the table. For each round of training, the basis table can be generated. The generated basis table and prediction table can be compared and utilized by the system to train the model to make better predictions of out-of-stock or in-stock items. In some implementations, the table can be generated in near real-time and utilized in a training feedback loop.

In some implementations, the machine-learning models can be updated to account for expected spikes in demand or other predictable impacts on demand (e.g., flowers around Mother's Day, candy at Halloween, and the like).

Retraining can include Machine Learning Engineering (MLE) orchestration layer to run in parallel or subsequent to one another and allow for more efficient training and updating of the machine-learned models. Analyzing the performance of the models can include consideration of feature drift or the final distribution of the machine-learned model's output. While offline training for the model has been described in detail, the machine-learned models can also be subject to online training or tuning once deployed. In some instances, the models can be stored on user devices to allow for on-device data processing as well as personalization of the respective models to the user devices.

The out-of-stock model can be trained to make predictions on what items are likely to be in-stock or out-of-stock. The models can be trained using training data as described above. In some implementations, the training data can include historical data, real-time catalog data, or real-time item check data as described herein. In some instances, the training data can include basis tables for use in training and making batch predictions.

In some instances, a measure of model performance can be represented in terms of an example badge effect and an example redirect effect. For instance, the system can determine an expected impact associated with item suppression (e.g., removal of item from a catalog) or item badging (e.g., visually marking the item as likely out-of-stock, providing a replacement recommendation). The badge effect and redirect effect can be defined in terms of the original demand and the proportion of the original demand. For instance, the original demand for a user to purchase a banana could be represented as 1. Thus, if the banana is in stock, the user will purchase the banana (e.g., indicated by a user searching for "banana" via the application). The out-of-stock model can determine a likelihood that the grocery item banana is out-of-stock at the particular merchant. Responsive to this determination, the intervention model can determine an intervention action, such as adding a badge indicating that the grocery item banana is likely out-of-stock. The system can obtain data indicative of a response to the item being out-of-stock. For instance, the data can include indication of a user exiting out of the merchant's catalog (e.g., selecting another merchant to order from or exiting out of the application), ordering the badged item, or ordering a recommended replacement item.

The badge effect can be representative of an item-level demand loss resulting from the effect of the badge. For instance, but-for the badge on the item, would the demand for the banana drop below 1. The redirect effect can be representative of a percentage of demand redirected toward other grocery items. For instance, what amount of the demand of 1 for the banana was redirected to substitution items such as another type of fruit, ice cream, or some other item. Each response action (e.g., suppression or badging) can be associated with an effect on demand. For instance, a user exiting out of the merchant's catalog can be associated with the following demand change:

$$\Delta D = BE * (1 - RE)$$

Where $\Delta D$ is the change in demand, BE is the badge effect, and RE is redirect effect. Ordering the badged item can be associated with the following demand change:

$$\Delta D = 1 - BE$$

Where $\Delta D$ is the change in demand and BE is the badge effect. Ordering a recommended replacement item can be associated with the following demand change:

$\Delta D = BE * RE$

Where $\Delta D$ is the change in demand, BE is the badge effect, and RE is the redirect effect. The proposed intervention model can utilize the badge effect and redirect effect to evaluate the performance of the invention model. For instance, a higher redirect effect and lower badge effect can be associated with an intervention model that performs better than an intervention model with a high badge effect and low redirect effect.

A redirect effect can also occur for items that are completely removed from a catalog. As an example, if an item has a 0 to 50% chance of being out-of-stock, the intervention model can determine that no intervention action should be performed. If an item has a 50% to 75% likelihood of being out-of-stock, the intervention model can determine that badging or recommending replacement items should occur. If an item has a 75% to 100% likelihood of being out-of-stock the intervention action can include removing the item from the catalog, badging the item as out-of-stock, or recommending replacement items. These ranges are provided for example purposes only and are not meant to be limiting. The ranges associated with various intervention actions can be determined or predetermined and can vary by merchant or by item.

For instance, of an initial 100% of demand before removing an item, a portion of the demand is redirected if the initially searched or selected item is determined to be highly likely to be out-of-stock and the intervention action is removal from the merchant catalog. The metrics described herein allow for an example determination of model performance and the interplay with business metrics. This can allow for determining the technical effects and efficiencies gained by training the models in a more efficient manner while additionally determining business metrics and real-world impact of badging or suppressing items from a merchant catalog. These metrics can be determined using offline evaluation of the models and comparing the portion of merchant catalogs subject to the intervention actions to a holdout group (e.g., control group) of merchants, items, or users.

In some implementations the intervention action includes data censoring. For instance, data censoring can include removing one or more items from a catalog if the output score of the associated item satisfies an intervention criterion. For instance, an intervention criterion can include the item being more likely than not to be out-of-stock. Or that the output score exceeds a predetermined threshold, or a threshold that is determined based on one or more additional factors. By removing items that are likely to be out-of-stock, the machine-learned model can, overtime, become biased and skew due to the lack of data associated with the items that would be determined to be out-of-stock, but-for the item being removed from the catalog. As such, the system can incorrectly determine that more items are in stock, when in fact, the items that are likely out-of-stock have simply been removed.

For instance, prior heuristic-based methods included hard rules that would remove items when certain conditions were met. For instance, if an item was last sold more than one week ago, the item would be removed. However, the issue is that this can changes with features of covariates (e.g., features that have effect on each other's demand), for instance, if an item is a substitute for another popular item that is out-of-stock, the demand and supply of the respective items can be related and have an impact on the real-time inventory of each item.

Due to the potential for use of censored data to impact future prediction patterns, the present method can provide for utilizing a segmented holdout (e.g., control) group for training the machine-learned models. The segmented holdout is not subject to suspension and can be processed by the machine-learned models multiples times in training to provide for a representation comparable to the entirety of the data being uncensored. The uncensored training data can result in the model providing better and more reliable predictions on: (1) whether an item is out-of-stock or (2) the potential impact of applying an intervention action with regard to one or more inventory items (e.g., to determine badge or redirect effect).

As described herein, the network system 101 can include a data repository 105. An example of a data structure that can be stored in or associated with the data repository 105 is described with reference to FIG. 4.

FIG. 4 depicts an example data structure stored in memory according to example embodiments of the present disclosure. Example data can include near real-time signals datastore 400. The near real-time signals datastore 400 can include enriched data 402, service provider data 420, or merchant data 435.

Enriched data 402 can include aggregated catalog availability 405, service provider product type 410, or other enriched data 415. For instance, aggregated catalog availability 405 can include an aggregate of cross-merchant or cross-merchant-location item inventory. For instance, brand A of soap can have an in-stock or out-of-stock designation not based on a specific store's stock, but rather looking at a certain number of merchants or locations within a geographic region and combining the data into one aggregated structure. Service provider product type 410 can include, for instance, the type of store of the associated service provider. For instance, service provider product type 410 can include grocery store, gas station, convenience store, or can be associated with a type of item.

Service provider data 420 can include parent chain availability 425 or service provider data 430. Parent chain availability data can include data that is aggregated by the service provider and associated with multiple physical locations of a merchant (e.g., parent chain). As such, two Brand A convenience stores located 0.5 miles from one another can have a parent chain availability 425 data structure to combine or consolidate item inventory across physical store locations. Service provider data 430 can include other service-related data. For instance, the service provider data can include current demand, expected purchases to be completed within a threshold amount of time, or other data that can be used in out-of-stock prediction model and intervention model.

Merchant data 435 can include merchant stock amount 440, last seen date 445, last seen date to purchase 450, merchant re-stock date 455, merchant product cover days 460, last trailing hour or dates of merchant unit sales 465. Merchant stock amount 440 can include a numerical designation of the number of an item that are currently in-stock at a merchant location. Last seen date 445 can be indicative of the last time an item was marked as in-stock at a merchant location. Last seen date to purchase 450 can include an indication of when the last purchase was made. Merchant re-stock date 455 can include a date at which the items were restocked, or a date at which the items will likely be restocked. Merchant product cover days 460 can include an estimated number of days' worth of stock is currently in your possession. Last trailing hour or dates of merchant until sales 465 can include an indication of demand over the past X number of hours or days. For instance, how many bags of sour gummies have been purchased in the past 3 hours or 10 days. The trailing hour or dates number can be selected based on merchant or item characteristics.

Figure 5:
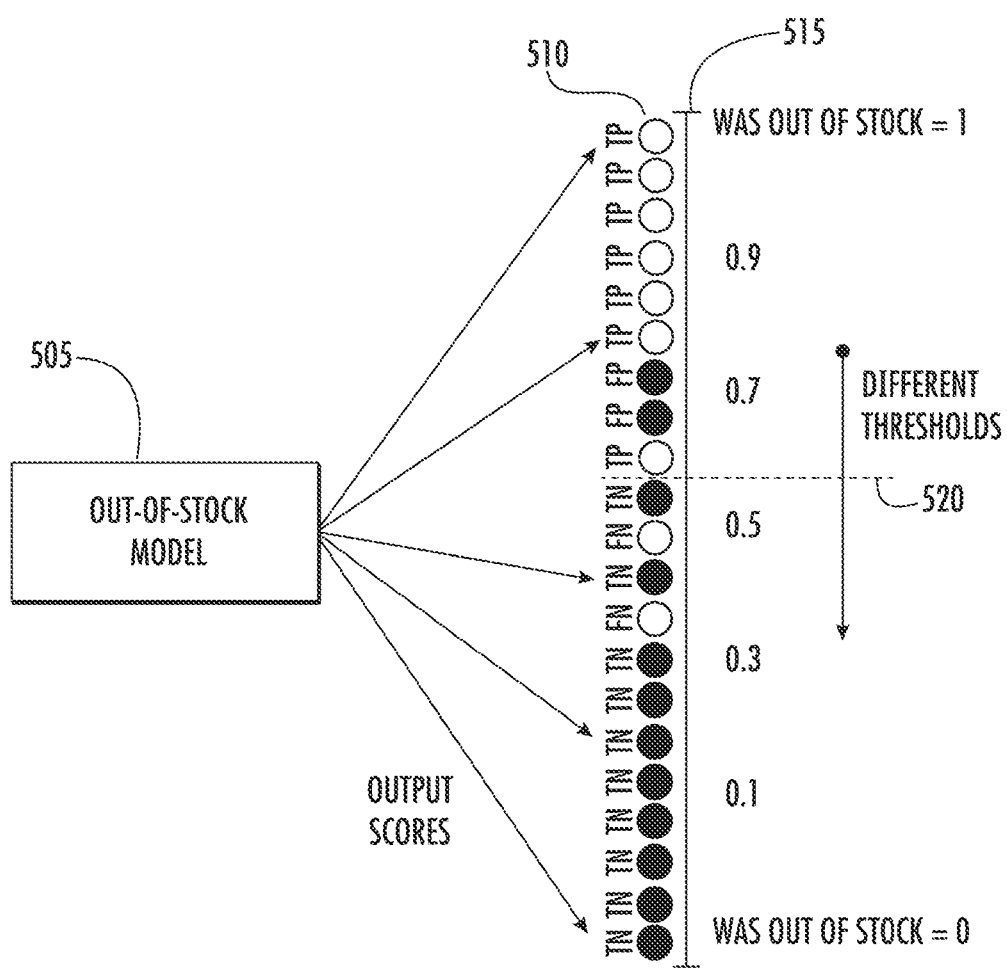
FIG. 5 depicts a block diagram of example out-of-stock model output according to example aspects of the present disclosure.

As described herein, the data depicted in FIG. 4 can be used by the network system 101 to generate a number of output scores associated with various items. The output scores can be associated with predictions of a likelihood of one or more items being out-of-stock and a performance table. FIG. 5 depicts an example out-of-stock model 505 and a distribution of output scores 510. In the present example, the output scores 510 can be in the form of a normalized score between zero and one. For instance, output scores closer to zero can be associated with a low likelihood of being out of stock and an output score 510. The different threshold 520.

The system can include one or more thresholds 520 which can be manually set or automatically determined. For instance, one or more thresholds 520 can be an intervention criterion. Such that, if the intervention criterion is satisfied (e.g., a threshold is exceeded), an intervention action can be performed. The one or more thresholds 520 can be utilized by the system (e.g., intervention model) to determine an appropriate intervention action.

The output score 510 can include true negatives, true positives, false positive, and false negatives. The system can perform a check to evaluate model performance by comparing the output scores 510 and the determination to perform an intervention action. For instance, a true negative can include an output score indicative of an item not being out-of-stock and the system predicting that the item is not out-of-stock. A true positive can be the item being out of stock and the system predicting that the item is out of stock. A false positive can be when an item is not out of stock, but the system predicts the item to be out-of-stock. A false negative can include when an item is out of stock, but the system predicts that the item is not out-of-stock. The various rates or counts of true negative, false positive, false negative, or true positive can be used to evaluate the out-of-stock model or intervention model performance.

Figure 6:
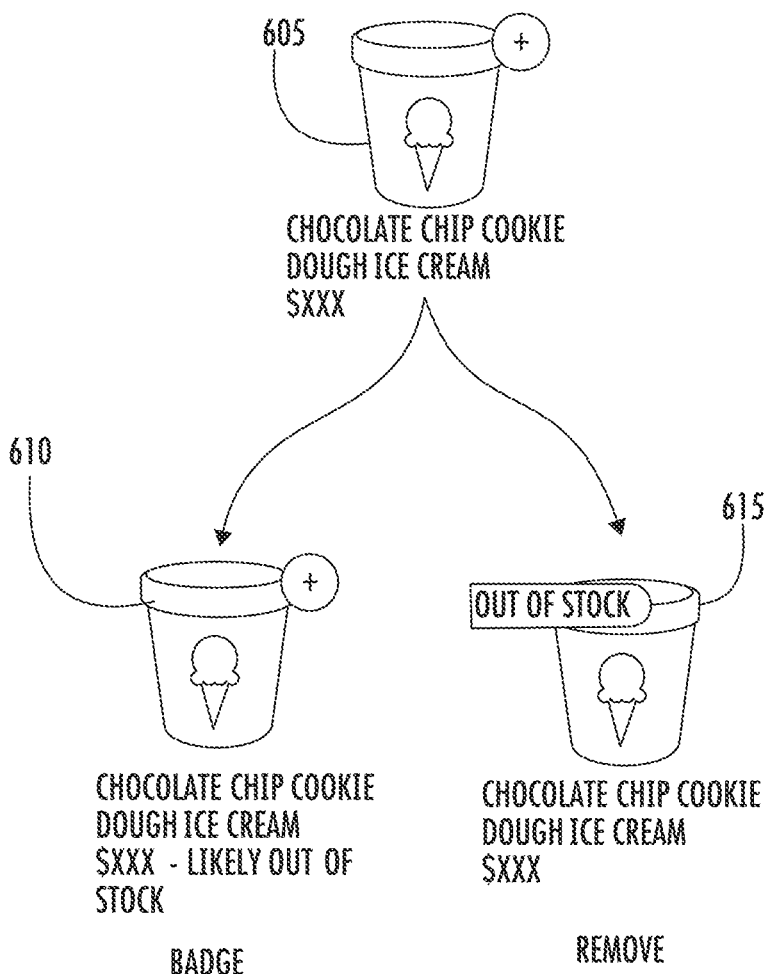
FIG. 6 depicts an intervention flow according to example aspects of the present disclosure.

Based on the generated out-of-stock predictions for items, the intervention pipeline can be used to determine an intervention action. FIG. 6 depicts example intervention actions 600 for an item that has a likelihood of being out-of-stock that satisfies an intervention criterion (e.g., exceeds a predefined threshold, exceeds a threshold determined in near-real time). For instance, in a normal state, item 605 can be provided for display as a selectable item. However, the out-of-stock prediction model can determine that the output score satisfies an intervention criterion associated with a high likelihood that item 605 is out-of-stock. As such, two potential intervention actions include a badge 610 or removal 615.

Badge 610 can include providing a visual indication or message that one or more items are likely out-of-stock. For instance, the item can still be selected or added to a cart (e.g., by selecting the plus sign). Additionally, or alternatively, the system can provide for one or more alternative recommendations. The one or more alternative recommendations can be determined based on user data or other personalization data.

Removal 615 can include providing a visual indication that an item is out-of-stock or other preventing the item from being displayed via application 122. For instance, removal 615 can result in the inability for an item to be added to a cart. In some implementations, removal results in an item being removed from the catalog. In some implementations, removal results in an item being searchable but an inability to add such items to cart. In some instances, the item can be grayed out and include an "out of stock" label as depicted in removal 615.

FIG. 7 depicts a flowchart diagram of an example method according to example aspects of the present disclosure. One or more portion(s) of the method 700 can be implemented by one or more computing devices such as, for example, the computing devices/systems described in FIGS. 1, 8, etc. Moreover, one or more portion(s) of the method 700 can be implemented as an algorithm on the hardware components of the device(s) described herein. For example, a computing system can include one or more processors and one or more non-transitory, computer-readable media storing instructions that are executable by the one or more processors to cause the computing system to perform operations, the operations including one or more of the operations/portions of method 700. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

In an embodiment, the method 700 can include a step 702, obtaining feature data including at least (i) aggregations of historical found rate data, (ii) item level metadata, and (iii) merchant signal data into an out-of-stock model.

Feature data can include, for example, data stored in near real-time signals datastore 400 or data repository 105. For instance, aggregations of historical found rate data can include aggregated data of items across merchants or merchants across regions. Item level metadata can include feature data associated with one or more grocery items. In some instances, item level metadata can include raw signal data or enriched data. Merchant signal data can include data associated with merchant inventory. In some instances, merchant signal data can include raw signal data or enriched data.

In some instances, before obtaining data including one or more features associated with a plurality of items, the method can include accessing a plurality of inventory listings associated with a plurality of merchants. The inventory listings can include a plurality of items and plurality of quantities of the respective items.

The method 700 can include a step 704, determining, by the out-of-stock model, a plurality of output scores for a plurality of items. The output scores can be indicative of a likelihood of an item being out-of-stock. For instance, the output scores can be a numerical score or a Boolean value. In some instances, the output can include a probability that a first item of the plurality of items is out-of-stock.

In some implementations, the output scores can be a normalized score between 0 and 1 that represents a likelihood that the item is out-of-stock. For instance, a 1 can be associated with a 100% certainty that the item is out-of-stock and a 0 can be associated with a 100% certainty that the item is in-stock or otherwise available. For instance, the output score can include a rank correlated with probability that the out-of-stock model thinks that an item is out-of-stock. In some implementations, offline validation of the model can include comparing the generated output scores and determination of an item being out-of-stock to ground truth data. The system can generate a table indicative of true negative, false positive, false negative, and true positive to evaluate the performance of the out-of-stock model.

The out-of-stock models can be machine-learned models trained to generate predictions of likelihood of an item being out-of-stock or unavailable. The input data obtained by the out-of-stock model can include feature data as described above. The feature data can be associated with an item, store, or location. The out-of-stock model can output scores for each grocery item in a grocery catalog. In some instances, the output scores can be generated on a regular cadence and stored in a database accessible by an application programming interface configured to provide one or more suggested items or access to a catalog of grocery items and data associated with the grocery items.

In some instances, the out-of-stock model can include a tree-based model architecture (e.g., XG Boost). The tree-based model architecture can allow for flexible interactions between features associated with the respective grocery items. In some implementations, the out-of-stock model can be trained using supervised or unsupervised learning.

The method 700 can include a step 706, determining a first output score for a first item of the plurality of items satisfies an intervention criterion. For instance, satisfying an intervention criterion can include an output score that exceeds a probability of out-of-stock threshold. The probability of out-of-stock threshold can be a static probability or dynamic probability. For instance, the probability can be adjusted based on various real-time signals, user data, or other relevant factors.

In some implementations, an intervention criterion can include a threshold probability that, when exceeded, results in an intervention action being performed. In some instances, an intervention criterion can include a range of output scores that are associated with different workflows (e.g., automatically displaying the grocery item, determining that the output scores should be provided to the intervention model).

The method 700 can include a step 708, responsive to determining the first output score satisfies the intervention criterion, performing an intervention action. In some instances, the method can include determining the intervention action based on: (i) user session data, (ii) the first output score, or (iii) historical user data. As described herein, the output score satisfying the intervention criterion includes the output score exceeding a predetermined probability that the item is likely out-of-stock. As described herein, determining the intervention action can be based on one or more output scores of the plurality of output scores. For instance, an intervention action for a first item can be determined based on the output score of a comparable or related item. In some implementations, each item of the plurality of items can have a unique predetermined probability. The system can determine the intervention action based on a subset of output scores (e.g., of items that are related).

In some instances, the method can include transmitting data including instructions that when read by a processor cause a computing device to perform operations, the operations including performing, the intervention action.

In some implementations, the system can determine, based on a probability that a first item of the plurality of items is out-of-stock, the intervention action. As described herein, this can be based at least in part on historical user data. Historical user data can include at least one of (i) one or more user preferences, (ii) one or more prior orders, or (iii) one or more frequently ordered items.

As described herein, an intervention action can include at least one of: (i) removing the first item from a catalog associated with a merchant associated with the first item or (ii) providing for display a notification via the user interface. The notification can include at least one of: (i) a message indicative of the first item likely being out-of-stock or (ii) one or more substitution recommendations.

For instance, removing an item from a catalog can involve suppression of the item which can prevent the item from being displayed as an available item from a merchant. By way of example, removing the first item from a catalog associated with the merchant associated with the first item results in the item being inaccessible via an in-application query. For instance, a small set of stores can be able to suppress or remove items based on intervention criterion being satisfied. By way of example, if a predetermined probability or likelihood of being out-of-stock is exceeded, the system can remove the item from the catalog. The predetermined probability can be set based on a category or subcategory associated with the item. For instance, an item with numerous substitutes may be more likely to be suppressed than an item with little to no substitutes. Or if an item has little to no substitutes, the predetermined threshold likelihood can be a higher value than an item that can easily be replaced.

As described herein, providing for display a notification via the user interface can include at least one of: (i) a message indicative of the first item likely being out-of-stock, 25 26

(ii) one or more substitution recommendations, or (iii) a message indicative of the first item being out-of-stock.

In some instances, the intervention model can be personalized to a user identifier or characteristic of one or more user identifiers. For instance, the predetermined intervention criterion can be determined based on one or more user preferences. For instance, a determination of a badging (e.g., recommending a replacement item or providing a visual indication that the item is likely out-of-stock) or suppression (e.g., removing an item from a catalog and prevent the item from being shown via an application located with the user device).

As described herein, e.g., with respect to FIG. 3, offline evaluation or validation of the out-of-stock model can be performed. For instance, the offline evaluation can take into consideration the performance of the out-of-stock model or the intervention model. For instance, the offline evaluation can determine an estimated effect (e.g., badge effect or redirect effect) for performing an intervention action.

Additionally, or alternatively, method 700 can include training the out-of-stock model or the intervention model. For instance, the out-of-stock model or intervention model can include a machine-learned model. The out-of-stock model is trained based on a training data structure, wherein the training data structure is generated based on at least one of sensor data or user input data obtained via one or more shopper devices.

As described herein, the data structure can include at least: (i) the one or more items and (ii) the out-of-stock or in-stock indication for each respective item of the one or more items. In some implementations, the data structure was obtained by a shopper device located within a merchant location performing an item check.

Figure 8:
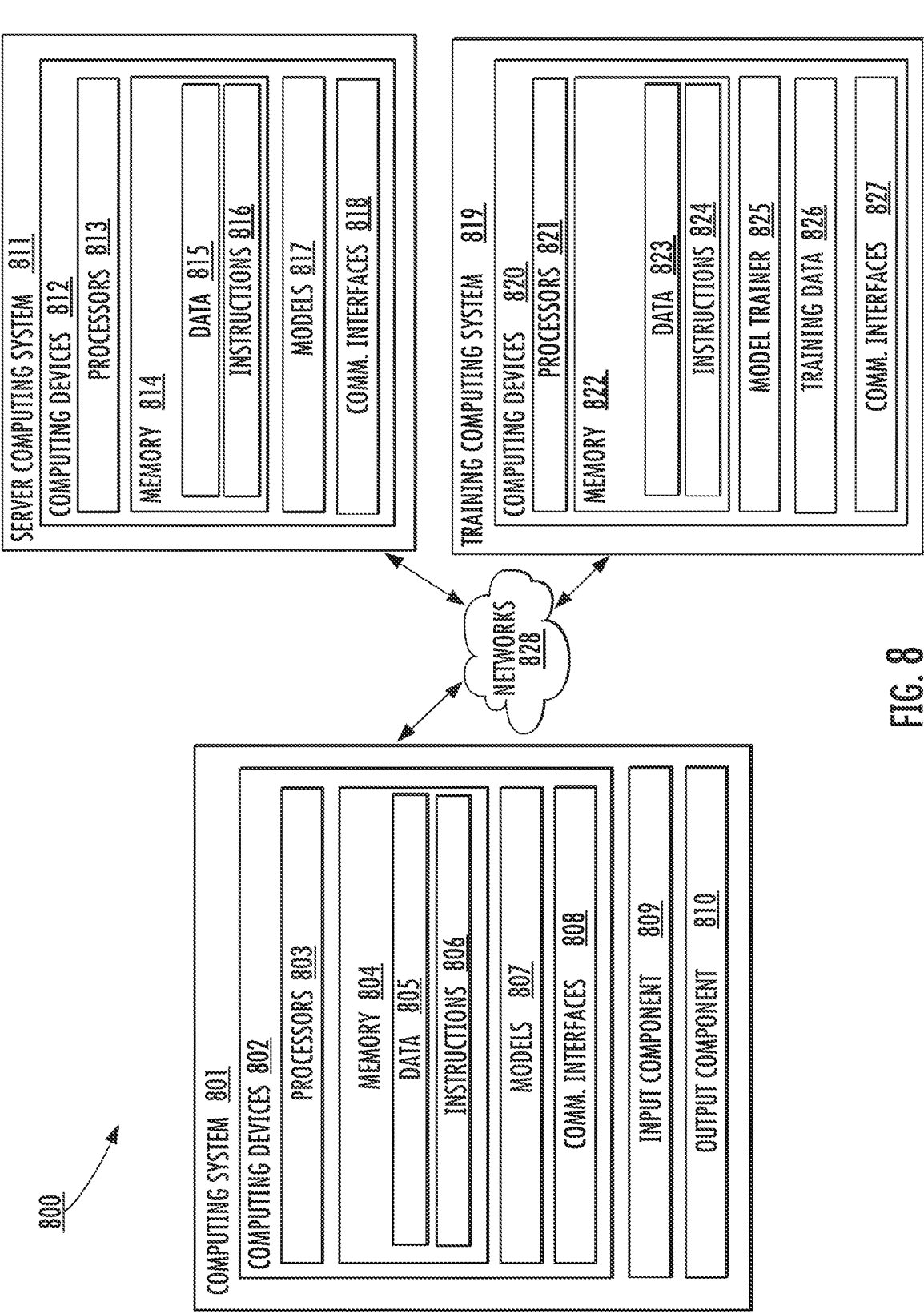
FIG. 8 depicts a block diagram of an example computing system according to example embodiments of the present disclosure.

FIG. 8 depicts a block diagram of an example system 800 for implementing systems and methods according to example embodiments of the present disclosure. The system 800 includes a computing system 801 (e.g., a shopper device 131 corresponding to a shopper 135 or a user device 121 corresponding to user 125), a server computing system 811 (e.g., a network system 101, cloud computing platform), and a training computing system 819 communicatively coupled over one or more networks 828.

The computing system 801 can include one or more computing devices 802 or circuitry. For instance, the computing system 801 can include one or more processors 803 and a memory 804. In an embodiment, the processors 803 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, etc., and combinations thereof.

The memory 804 can store information that can be accessed by the processors 803. For instance, the memory 804 (e.g., memory devices) can store data 805 that can be obtained, received, accessed, written, manipulated, created, and/or stored. The data 805 can include, for instance, any of the data or information described herein. In some implementations, the computing system 801 can obtain data from one or more memories that are remote from the computing system 801.

The memory 804 can also store computer-readable instructions 806 that can be executed by the processor(s) 803. The instructions 806 can be software written in any suitable programming language or can be implemented in hardware.

The instructions 806 can be executed in logically and/or virtually separate threads on the processor(s) 803. For example, the memory 804 can store instructions 806 that when executed by the processor(s) 803 cause the processor(s) 803 to perform any of the operations, methods and/or processes described herein. In some cases, the memory 804 can store computer-executable instructions or computer-readable instructions, such as instructions to perform at least a portion of the method of FIG. 8.

In an embodiment, the computing system 801 can store or include one or more machine-learned models 807. For example, the machine-learned models 807 can be or can otherwise include various machine-learned models. In an embodiment, the machine-learned models 807 can include neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In an embodiment, the one or more machine-learned models 807 can be received from the server computing system 811 over networks 828, stored in the computing system 801 (e.g., memory 804), and then used or otherwise implemented by the processor(s) 803. In an embodiment, the computing system 801 can implement multiple parallel instances of a single model.

Additionally, or alternatively, one or more machine-learned models 807 can be included in or otherwise stored and implemented by the server computing system 811 that communicates with the computing system 801 according to a client-server relationship. For example, the machine-learned models 807 can be implemented by the server computing system 811 as a portion of a web service. Thus, one or more models 807 can be stored and implemented at the computing system 801 and/or one or more models 807 can be stored and implemented at the server computing system 811.

The computing system 801 can include one or more communication interfaces 808. The communication interfaces 808 can be used to communicate with one or more other systems. The communication interfaces 808 can include any circuits, components, software, etc. for communicating via one or more networks (e.g., networks 828). In some implementations, the communication interfaces 808 can include for example, one or more of a communications controller, receiver, transceiver, transmitter, port, conductors, software and/or hardware for communicating data/information.

The computing system 801 can also include one or more user input components 809 that receives user input. For example, the user input component 809 can be a touch-sensitive component (e.g., a touch-sensitive user interface of a mobile device) that is sensitive to the touch of a user input object (e.g., a finger or a stylus). The touch-sensitive component can serve to implement a virtual keyboard. Other example user input components include a microphone, a traditional keyboard, cursor-device, joystick, or other devices by which a user can provide user input.

The computing system 801 can include one or more output components 810. The output components 810 can include hardware and/or software for audibly or visually producing content. For instance, the output components 810 can include one or more speakers, earpieces, headsets, handsets, etc. The output components 810 can include a display device, which can include hardware for displaying a user interface and/or messages for a user. By way of example, the output component 810 can include a display screen, CRT, LCD, plasma screen, touch screen, TV, projector, tablet, and/or other suitable display components.

The server computing system 811 can include one or more computing devices 812. In an embodiment, the server computing system 811 can include or is otherwise implemented by one or more server computing devices. In instances in which the server computing system 811 includes plural server computing devices, such server computing devices can operate according to sequential computing architectures, parallel computing architectures, or some combination thereof.

The server computing system 811 can include one or more processor(s) 813 and a memory 814. In an embodiment, the processors 813 can be any suitable processing device (e.g., a processor core, a microprocessor, an ASIC, a FPGA, a controller, a microcontroller, etc.) and can be one processor or a plurality of processors that are operatively connected. The memory 814 can include one or more non-transitory computer-readable storage media, such as RAM, ROM, EEPROM, EPROM, one or more memory devices, flash memory devices, etc., and combinations thereof. In an embodiment, the memory 814 can be a memory device, also referred to as a data storage device, which can include an electronic storage device, a magnetic storage device, an optical storage device, an electromagnetic storage device, a semiconductor storage device, or any suitable combination thereof. The memory can form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The memory 814 can store information that can be accessed by the processor(s) 813. For instance, the memory 814 (e.g., memory devices) can store data 815 that can be obtained, received, accessed, written, manipulated, created, and/or stored. The data 815 can include, for instance, any of the data or information described herein. In some implementations, the server computing system 811 can obtain data from one or more memories that are remote from the server computing system 811.

The memory 814 can also store computer-readable instructions 816 that can be executed by the processor(s) 813. The instructions 816 can be software written in any suitable programming language or can be implemented in hardware. The instructions can include computer-readable instructions, computer-executable instructions, etc.

The instructions 816 can be executed in logically and/or virtually separate threads on the processor(s) 813. For example, the memory 814 can store instructions 816 that when executed by the processor(s) 813 cause the processor(s) 813 to perform any of the operations, methods and/or processes described herein. In some cases, the memory 814 can store computer-executable instructions or computer-readable instructions, such as instructions to perform at least a portion of the methods of FIG. 7.

The server computing system 811 can store or otherwise include one or more machine-learned models 817. The machine-learned models 817 can include or be the same as the models 807 stored in computing system 801. In an embodiment, the machine-learned models 817 can include an unsupervised learning model. In an embodiment, the machine-learned models 817 can include neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

The machine-learned models described in this specification can have various types of input data and/or combinations thereof, representing data available to sensors and/or other systems. Input data can include, for example, latent encoding data (e.g., a latent space representation of an input, etc.), statistical data (e.g., data computed and/or calculated from some other data source), sensor data (e.g., raw and/or processed data captured by a sensor of a computing device), or other types of data.

The server computing system 811 can include one or more communication interfaces 818. The communication interfaces 818 can be used to communicate with one or more other systems. The communication interfaces 818 can include any circuits, components, software, etc. for communicating via one or more networks (e.g., networks 828). In some implementations, the communication interfaces 818 can include for example, one or more of a communications controller, receiver, transceiver, transmitter, port, conductors, software and/or hardware for communicating data/information.

The computing system 801 and/or the server computing system 819 can train the models 807, 817 via interaction with the training computing system 819 that is communicatively coupled over the networks 828. The training computing system 819 can be separate from the server computing system 811 or can be a portion of the server computing system 811.

The training computing system 819 can include one or more computing devices 820. In an embodiment, the training computing system 819 can include or is otherwise implemented by one or more server computing devices. In instances in which the training computing system 819 includes plural server computing devices, such server computing devices can operate according to sequential computing architectures, parallel computing architectures, or some combination thereof.

The training computing system 819 can include a processor(s) 821 and a memory 822, also referred to herein as memory 822. In an embodiment, the processors 821 can be any suitable processing device (e.g., a processor core, a microprocessor, an ASIC, a FPGA, a controller, a microcontroller, etc.) and can be one processor or a plurality of processors that are operatively connected. The memory 822 can include one or more non-transitory computer-readable storage media, such as RAM, ROM, EEPROM, EPROM, one or more memory devices, flash memory devices, etc., and combinations thereof.

In an embodiment, the memory 822 can be a memory device, also referred to as a data storage device, which can include an electronic storage device, a magnetic storage device, an optical storage device, an electromagnetic storage device, a semiconductor storage device, or any suitable combination thereof. The memory can form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The memory 822 can store information that can be accessed by the processor(s) 821. For instance, the memory 822 (e.g., memory devices) can store data 823 that can be obtained, received, accessed, written, manipulated, created, and/or stored. The data 823 can include, for instance, any of the data or information described herein. In some implementations, the training computing system 819 can obtain data from one or more memories that are remote from the training computing system 819.

The memory 822 can also store computer-readable instructions 824 that can be executed by the processor(s) 821. The instructions 824 can be software written in any suitable programming language or can be implemented in hardware. The instructions can include computer-readable instructions, computer-executable instructions, etc.

The instructions 824 can be executed in logically or virtually separate threads on the processor(s) 821. For example, the memory 822 can store instructions 824 that when executed by the processor(s) 821 cause the processor(s) 821 to perform any of the operations, methods and/or processes described herein. In some cases, the memory 822 can store computer-executable instructions or computer-readable instructions, such as instructions to perform at least a portion of the methods of FIG. 7.

The training computing system 819 can include a model trainer 825 that trains the machine-learned models 807, 817 stored at the computing system 801 and/or the server computing system 811 using various training or learning techniques. For example, the models 807, 817 can be trained using a loss function. By way of example, for training a machine-learned segmentation or recommendation model, the model trainer 825 can use a loss function. For example, a loss function can be backpropagated through the model(s) 807, 817 to update one or more parameters of the model(s) 807, 817 (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

The model trainer 825 can train the models 807, 817 (e.g., a machine-learned clustering model) in an unsupervised fashion. As such, the models 807, 817 can be effectively trained using unlabeled data for particular applications or problem domains, which improves performance and adaptability of the models 807, 817.

The training computing system 819 can modify parameters of the models 807, 817 (e.g., the machine-learned models 230, 245, 505) based on the loss function such that the models 807, 817 can be effectively trained for specific applications in an unsupervised manner without labeled data.

The model trainer 825 can utilize training techniques, such as backwards propagation of errors. For example, a loss function can be backpropagated through a model to update one or more parameters of the models (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In an embodiment, performing backwards propagation of errors can include performing truncated backpropagation through time. The model trainer 825 can perform a number of generalization techniques (e.g., weight decays, dropouts, etc.) to improve the generalization capability of a model being trained. In particular, the model trainer 825 can train the machine-learned models 807, 817 based on a set of training data 826.

The training data 826 can include unlabeled training data for training in an unsupervised fashion. In an example, the training data 826 can include unlabeled sets of data indicative of varying types of data signals (e.g., determining the type and context of the data signal). The training data 826 can be specific to a merchant location to help focus the models 807, 817 on the particular merchant location.

In an embodiment, training examples can be provided by the computing system 801 (e.g., mobile device of the shopper). Thus, in such implementations, a model 807 provided to the computing system 801 can be trained by the training computing system 819 in a manner to personalize the model 807.

The model trainer 825 can include computer logic utilized to provide desired functionality. The model trainer 825 can be implemented in hardware, firmware, and/or software controlling a general-purpose processor. For example, in an embodiment, the model trainer 825 can include program files stored on a storage device, loaded into a memory and executed by one or more processors. In other implementations, the model trainer 825 can include one or more sets of computer-executable instructions that are stored in a tangible computer-readable storage medium such as RAM, hard disk, or optical or magnetic media.

The training computing system 819 can include one or more communication interfaces 827. The communication interfaces 827 can be used to communicate with one or more other systems. The communication interfaces 827 can include any circuits, components, software, etc. for communicating via one or more networks (e.g., networks 828). In some implementations, the communication interfaces 827 can include for example, one or more of a communications controller, receiver, transceiver, transmitter, port, conductors, software and/or hardware for communicating data/information.

The one or more networks 828 can be any type of communications network, such as a local area network (e.g., intranet), wide area network (e.g., Internet), or some combination thereof and can include any number of wired or wireless links. In general, communication over a network 828 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 8 illustrates one example computing system that can be used to implement the present disclosure. Other computing systems can be used as well. For example, in an embodiment, the computing system 801 can include the model trainer 825 and the training data 826. In such implementations, the models 807, 817 can be both trained and used locally at the computing system 801. In some of such implementations, the computing system 801 can implement the model trainer 825 to personalize the models 807, 817.

Computing tasks discussed herein as being performed at certain computing device(s)/systems can instead be performed at another computing device/system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" can be used interchangeably herein. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some implementations are described with a reference numeral for example illustrated purposes and are not meant to be limiting.

What is claimed is:

1. A computing system, comprising:
one or more processors; and
one or more non-transitory computer-readable media storing instructions that are executable by the one or more processors to cause the computing system to perform operations, the operations comprising:

obtaining feature data associated with one or more third-party merchants comprising at least (i) aggregations of historical found rate data, (ii) item level metadata, and (iii) merchant signal data into an out-of-stock model;

determining, by the out-of-stock model, a plurality of output scores for a plurality of items associated with the one or more third-party merchants, wherein the output scores are indicative of a likelihood of an item being out-of-stock, wherein the out-of-stock model comprises a machine learning model trained on training data generated based on at least one of sensor data or user input data obtained via one or more shopper devices located within a merchant location performing an item check;

determining a first output score for a first item of the plurality of items satisfies an intervention criterion; and responsive to determining the first output score satisfies the intervention criterion, performing an intervention action.

2. The computing system of claim 1, wherein the operations comprise:
determining the intervention action based on user session data and the first output score.

3. The computing system of claim 2, wherein determining the intervention action is based on one or more output scores of the plurality of output scores.

4. The computing system of claim 2, wherein the intervention action comprises at least one of: (i) removing the first item from a catalog associated with a merchant associated with the first item or (ii) providing for display a notification via the user interface.

5. The computing system of claim 4, wherein the notification comprises at least one of: (i) a message indicative of the first item likely being out-of-stock or (ii one or more substitution recommendations.

6. The computing system of claim 1, wherein the training data comprises at least: (i) the one or more items and (ii) an out-of-stock or in-stock indication for each respective item of the one or more items.

7. The computing system of claim 1, wherein the training data comprises at least: (i) the one or more items and (ii) an out-of-stock or in-stock indication for each respective item of the one or more items.

8. The computing system of claim 1, wherein the output score satisfying the intervention criterion comprises the output score exceeding a predetermined probability that the item is likely out-of-stock.

9. The computing system of claim 8, wherein each item of the plurality of items has a unique predetermined probability.

10. The computing system of claim 9, wherein the intervention action is determined based on a subset of the plurality of output scores.

11. A computer-implemented method comprising:
accessing a plurality of inventory listings associated with a plurality of third-party merchants, the inventory listings comprising a plurality of items and plurality of quantities of the respective items;

obtaining data comprising one or more features associated with the plurality of items associated with the plurality of third-party merchants;

inputting the obtained data as input into an out-of-stock prediction model;

generating, by the out-of-stock prediction model, a probability that a first item of the plurality of items is out-of-stock, wherein the out-of-stock model comprises a machine learning model trained on training data generated based on at least one of sensor data or user input data obtained via one or more shopper devices located within a merchant location performing an item check;

determining, based on the probability that the first item of the plurality of items is out-of-stock, an intervention action; and transmitting data comprising instructions that when read by a processor cause a computing device to perform operations, the operations comprising performing, the intervention action.

12. The computer-implemented method of claim 11, comprising:

determining the intervention action based on: (i) user session data, (ii) a first output score, and (iii) historical user data.

13. The computer-implemented method of claim 12, wherein the historical user data comprises at least one of: (i) one or more user preferences, (ii) one or more prior orders, or (iii) one or more frequently ordered items.

14. The computer-implemented method of claim 11, wherein the intervention action comprises at least one of: (i) removing the first item from a catalog associated with a merchant associated with the first item or (ii) providing for display a notification via a user interface.

15. The computer-implemented method of claim 14, wherein removing the first item from a catalog associated with the merchant associated with the first item results in the item being inaccessible via an in-application query.

16. The computer-implemented method of claim 14, wherein providing for display a notification via the user interface comprises at least one of: (i) a message indicative of the first item likely being out-of-stock, (ii) one or more substitution recommendations, or (iii) a message indicative of the first item being out-of-stock.

17. One or more non-transitory computer readable media storing instructions that are executable by one or more processors to perform operations comprising:

processing the merchant data via a feature engineering pipeline to normalize the merchant data obtained from at least one of the plurality of third-party merchants;

accessing a plurality of inventory listings associated with a plurality of third-party merchants, the inventory listings comprising a plurality of items and plurality of quantities of the respective items;

obtaining data comprising one or more features associated with the plurality of items associated with the plurality of third-party merchants;

inputting the obtained data as input into an out-of-stock prediction model;

generating, by the out-of-stock prediction model, a probability that a first item of the plurality of items is out-of-stock, wherein the out-of-stock model comprises a machine learning model trained on training data generated based on at least one of sensor data or user input data obtained via one or more shopper devices located within a merchant location performing an item check;

determining, based on the probability that the first item of the plurality of items is out-of-stock, an intervention action; and transmitting data comprising instructions that when read by a processor cause a computing device to perform operations, the operations comprising performing, the intervention action.

18. The computing system of claim 1, wherein the merchant signal data is obtained at inconsistent cadences, wherein the operations comprise:

processing, by a feature engineering pipeline, the merchant data to normalize the data by at least one of: (i) performing extrapolation of the merchant data or (ii) pulling the merchant data until new data for a respective merchant is obtained.

* * * * *